United States Patent
Lee et al.

(10) Patent No.: US 9,619,176 B2
(45) Date of Patent: Apr. 11, 2017

(54) MEMORY CONTROLLER, STORAGE DEVICE, SERVER VIRTUALIZATION SYSTEM, AND STORAGE DEVICE RECOGNIZING METHOD PERFORMED IN THE SERVER VIRTUALIZATION SYSTEM

(71) Applicant: SAMSUNG ELECTRONICS CO., LTD., Suwon-si, Gyeonggi-Do (KR)

(72) Inventors: Sang-Geol Lee, Seoul (KR); Won-Ju Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/755,538

(22) Filed: Jun. 30, 2015

(65) Prior Publication Data

US 2016/0054953 A1 Feb. 25, 2016

(30) Foreign Application Priority Data

Aug. 19, 2014 (KR) .................. 10-2014-0107758

(51) Int. Cl.
*G06F 3/06* (2006.01)
*G06F 13/10* (2006.01)

(52) U.S. Cl.
CPC ............ *G06F 3/0659* (2013.01); *G06F 3/067* (2013.01); *G06F 3/0613* (2013.01); *G06F 13/102* (2013.01)

(58) Field of Classification Search
CPC .... G06F 3/0659; G06F 3/0613; G06F 13/102; G06F 3/067
See application file for complete search history.

(56) References Cited

U.S. PATENT DOCUMENTS

| 8,386,642 | B2 | 2/2013 | Elzur |
| 8,676,949 | B2 | 3/2014 | Vilke et al. |
| 9,311,002 | B1* | 4/2016 | Scott ..................... G06F 3/0608 |
| 2010/0083247 | A1 | 4/2010 | Kanevsky et al. |
| 2011/0154318 | A1 | 6/2011 | Oshins et al. |
| 2011/0179414 | A1* | 7/2011 | Goggin ................... G06F 3/061 718/1 |
| 2011/0239213 | A1 | 9/2011 | Aswani et al. |

(Continued)

FOREIGN PATENT DOCUMENTS

KR 1020110071779 6/2011

OTHER PUBLICATIONS

Identify_Device_Data structure; http://msdn.microsoft.com/en-us/library/windows/hardware/FF55 9006-(V=VS.85).ASPX.

*Primary Examiner* — Idriss N Alrobaye
*Assistant Examiner* — Ronald Modo
(74) *Attorney, Agent, or Firm* — F. Chau & Associates, LLC

(57) ABSTRACT

A memory controller, a storage device (SD), a server virtualization system, and an SD recognizing method performed in the server virtualization system are provided. The memory controller includes a processor configured to generate a plurality of different pieces of identify device (ID) data in response to an identify device command received from a host so that the host recognizes a single physical SD as a plurality of physical storage devices (SDs), and a host interface which transmits the generated plurality of pieces of identify device data to the host.

20 Claims, 23 Drawing Sheets

(56) References Cited

U.S. PATENT DOCUMENTS

| | | | |
|---|---|---|---|
| 2012/0030415 A1* | 2/2012 | Selfin | G06F 3/061 |
| | | | 711/103 |
| 2013/0086583 A1* | 4/2013 | Uemura | G06F 9/45533 |
| | | | 718/1 |
| 2013/0173855 A1 | 7/2013 | Kim et al. | |
| 2013/0179660 A1 | 7/2013 | Reed et al. | |
| 2013/0254321 A1 | 9/2013 | Johnsen et al. | |
| 2014/0208025 A1* | 7/2014 | Asano | G06F 3/0659 |
| | | | 711/114 |
| 2014/0245427 A1* | 8/2014 | Nagai | G06F 21/44 |
| | | | 726/16 |

\* cited by examiner

FIG. 25A

| 0 | Features(7:0) | Command | C\|R\|R\|R\| PM Port | FIS Type (27h) |
|---|---|---|---|---|
| 1 | Device | LBA(23:16) | LBA(15:8) | LBA(7:0) |
| 2 | Features(15:8) | LBA(47:40) | LBA(39:32) | LBA(31:24) |
| 3 | Control | ICC 7\|6\|5\|4\|3\|2\|1\|0 | Count(15:8) | Count(7:0) |
| 4 | Reserved(0) | Reserved(0) | Reserved(0) | Reserved(0) |

FIG. 25B

| 0 | Error | Status | R\|I\|R\|R\| PM Port | FIS Type (34h) |
|---|---|---|---|---|
| 1 | Device | LBA(23:16) | LBA(15:8) | LBA(7:0) |
| 2 | Reserved(0) | LBA(47:40) | LBA(39:32) | LBA(31:24) |
| 3 | Reserved(0) | Reserved(0) | Count(15:8) | Count(7:0) |
| 4 | Reserved(0) | Reserved(0) | Reserved(0) | Reserved(0) |

MEMORY CONTROLLER, STORAGE DEVICE, SERVER VIRTUALIZATION SYSTEM, AND STORAGE DEVICE RECOGNIZING METHOD PERFORMED IN THE SERVER VIRTUALIZATION SYSTEM

CROSS-REFERENCE TO RELATED APPLICATIONS

This application claims priority to Korean Patent Application No. 10-2014-0107758, filed on Aug. 19, 2014, in the Korean Intellectual Property Office, the disclosure of which is incorporated by reference in its entirety herein.

BACKGROUND

1. Technical Field

The inventive concept relates to a virtualization system and a method of controlling the virtualization system, and more particularly, to a memory controller, a storage device, a server virtualization system, and a storage device recognizing method performed in the server virtualization system.

2. Discussion of Related Art

With developments in processor technology, interest in virtualization technology is increasing. In virtualization technology, a single physical device is able to independently operate many operating systems (OSs). In general, systems to which virtualization technology is applied provide increased resource usage efficiency but have degraded input/output (I/O) performances. Accordingly, research into virtualization systems having improved I/O performances is being conducted.

SUMMARY

At least embodiment of the inventive concept provides a memory controller that processes an identify device command so that a host recognizes a single physical storage device as a plurality of storage devices.

At least one embodiment of the inventive concept also provides a storage device that generates identify device data so that a host recognizes a single physical storage device as a plurality of storage devices.

At least embodiment of the inventive concept also provides a server virtualization system that performs device identification so that a plurality of virtual machines are connected to a single physical storage device.

At least one embodiment of the inventive concept also provides a storage device recognizing method performed in a server virtualization system, by which a host recognizes a single physical storage device as a plurality of storage devices.

According to an exemplary embodiment of the inventive concept, there is provided a memory controller including a processor which generates a plurality of pieces of identify device data in response to an identify device command received from a host; and a host interface which transmits the generated plurality of pieces of identify device data to the host.

According to an exemplary embodiment, the processor may generate a plurality of different pieces of identify device data so that the host recognizes a single physical device SD as a plurality of physical devices, in response to the received identify device command.

According to an exemplary embodiment, the plurality of pieces of identify device data may include information that defines a virtual storage device (SD) corresponding to each of a plurality of storage regions into which the single physical SD is divided.

According to an exemplary embodiment, the information that defines the virtual SD may be determined to have a unique device port address when the memory controller communicates with the host.

According to an exemplary embodiment, the information that defines the virtual SD may include at least one selected from information about a serial number and information about a world wide name (WWN).

According to an exemplary embodiment, the processor may generate a plurality of pieces of identify device data in response to a single identify device command, and the plurality of pieces of identify device data may include different pieces of serial number information and different pieces of WWN information.

According to an exemplary embodiment, the processor may divide a storage region of the single physical SD into a plurality of storage regions, based on an initially set command, and may set unique identify device data for a virtual SD corresponding to each of the plurality of storage regions.

According to an exemplary embodiment, the processor may divide the storage region into the plurality of storage regions by dividing a maximum logical block address of the single physical SD by N, wherein N is a natural number equal to or greater than 2.

According to an exemplary embodiment, the memory controller may further include a memory that stores the plurality of pieces of identify device data.

According to an exemplary embodiment of the inventive concept, there is provided a storage device (SD) including a memory controller which generates a control signal based on a command received from a host; and a memory device which writes or reads data, based on the control signal, wherein the memory controller transmits a plurality of different pieces of identify device data to the host in response to an identify device command received from the host so that the host recognizes the memory device as a plurality of physical storages devices.

According to an exemplary embodiment, the memory controller may transmit to the host a plurality of different pieces of identify device data respectively corresponding to a plurality of storage regions into which a storage region of the memory device is divided, in response to the received identify device command.

According to an exemplary embodiment, each of the plurality of pieces of identify device data may include at least one selected from information about a serial number and information about a WWN, and different serial numbers and different pieces of WWNs may be allocated for the plurality of storage regions.

According to an exemplary embodiment, the memory device may be at least one non-volatile memory device.

According to an exemplary embodiment, the non-volatile memory device may be a flash memory device.

According to an exemplary embodiment, the memory controller may read the plurality of pieces of identify device data from the memory device according to the identify device command and may transmit the read plurality of pieces of identify device data to the host.

According to an exemplary embodiment, the memory controller may calculate a physical address of the memory device, based on device port address information and logical block address information that are received from the host.

According to exemplary embodiment of the inventive concept, there is provided a server virtualization system including a server which communicates with devices that are connected to a host bus adaptor (HBA) and processes data in a virtualization environment, and at least one storage device (SD) that is connected to the HBA. A single physical SD of the at least one SD transmits a plurality of pieces of identify device data to the server in response to an identify device command received from the server so that the server recognizes the single physical SD as a plurality of physical storage devices (SDs).

According to an exemplary embodiment, the at least one SD may transmit to the server a plurality of different pieces of identify device data respectively corresponding to a plurality of storage regions into which an overall storage capacity of the single physical SD is divided, in response to the received identify device command.

According to an exemplary embodiment, the server may include a plurality of virtual machines (VMs) obtained by implementing a computing environment by using software, a hypervisor which manages the plurality of VMs, and the HBA which is connected to the at least one storage device and performs interfacing for data communication.

According to an exemplary embodiment, the HBA may support a single root input/output virtualization (SR-IOV) function for providing I/O virtualization.

According to an exemplary embodiment, the HBA may transmit the identify device command to a device connected to the server.

According to an exemplary embodiment, the HBA may allocate a plurality of virtual SDs derived from the single physical SD to the plurality of VMs, based on the plurality of pieces of identify device data.

According to an exemplary embodiment, the HBA allocates the plurality of VMs to at least one physical SD or to the plurality of virtual SDs.

According to an exemplary embodiment, the server may include a plurality of virtual machines (VMs) obtained by implementing a computing environment by using software, a hypervisor which manages the plurality of VMs, and a network adaptor which is connected to the at least one storage device on a network and performs interfacing for data communication.

According to exemplary embodiment of the inventive concept, there is provided a storage device (SD) recognition method performed in a server virtualization system, the method including receiving, by a single physical SD, an identify device command from a host during device recognition; and transmitting, by the single physical SD, a plurality of different pieces of identify device data to the host in response to the identify device command. The plurality of pieces of identify device data are generated numbering as many as a number of virtual SDs respectively corresponding to a plurality of storage regions into which the single physical SD is divided.

According to an exemplary embodiment, the plurality of pieces of identify device data may include different pieces of serial numbers and different pieces of WWNs for the virtual SDs respectively corresponding to the plurality of storage regions into which the single physical SD is divided.

According to an exemplary embodiment of the inventive concept, a server virtualization system is provided. The system includes a plurality of virtual machines comprising a first group of virtual machines and a second group of virtual machines, a plurality of first physical storage devices (SDs), a hypervisor configured to allocate the first physical SDs only to the first group among the virtual machines, and an adaptor configured to interface with the first physical SDs and allocate the first physical SDs only to the second group among the virtual machines.

In an exemplary embodiment, the system further includes a processor configured to generate different identity device data for each of a plurality of second physical SDs to enable a single one of the first physical SDs to be recognized as the plurality of second physical SDs. In an exemplary embodiment, the adaptor or the hypervisor are configured to allocate some of the second physical SDs to a first one of the virtual machines and another one of the second physical SDs to a second one of the virtual machines. In an exemplary embodiment, each identity device data includes a different world wide name and serial number pair. In an exemplary embodiment, the adaptor is one of a network adaptor and a host bus adaptor.

BRIEF DESCRIPTION OF THE DRAWINGS

Exemplary embodiments of the inventive concept will be more clearly understood from the following detailed description taken in conjunction with the accompanying drawings in which:

FIGS. 25A and 25B are Serial Advanced Technology Attachment (SATA) frame information structure (FIS) layouts that are applied when a host and an SD communicate with each other in a server virtualization system according to an exemplary embodiment of the inventive concept.

DETAILED DESCRIPTION

Figure 1:
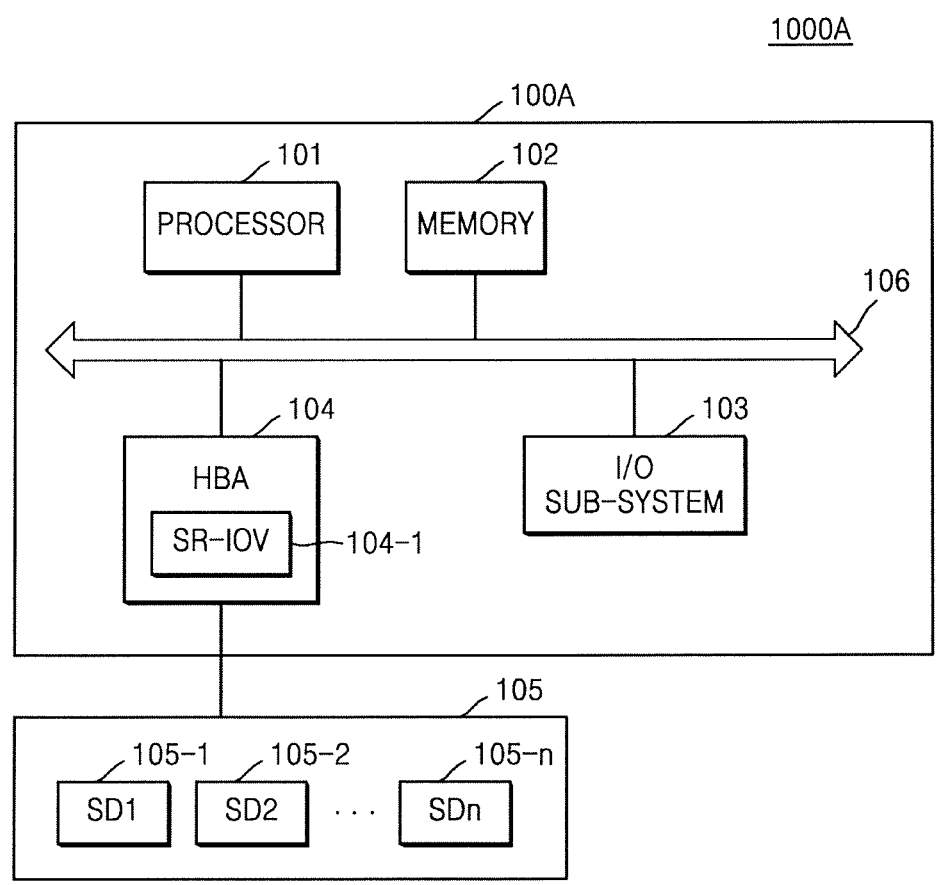
FIG. 1 is a block diagram of a computing system according to an exemplary embodiment of the inventive concept.

Hereinafter, the inventive concept will be described more fully with reference to the accompanying drawings, in which exemplary embodiments of the inventive concept are shown. These embodiments are provided so that this disclosure will be thorough and complete, and will fully convey the scope of the inventive concept to one of ordinary skill in the art. As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the drawings, like reference numerals denote like elements and the sizes or thicknesses of elements may be exaggerated for clarity of explanation.

An expression used in the singular encompasses the expression in the plural, unless it has a clearly different meaning in the context.

FIG. 1 is a block diagram of a computing system 1000A according to an exemplary embodiment of the inventive concept.

Referring to FIG. 1, the computing system 1000A includes a processor 101, a memory 102, an input/output (I/O) sub-system 103, a host bus adaptor (HBA) 104, devices 105, and a bus 106.

Referring to FIG. 1, the processor 101, the memory 102, the I/O sub-system 103, the HBA 104, and the bus 106 constitutes a host 100A, and first through n-th storage devices (SDs) 105-1 through 105-n, namely, the devices 105, are external devices that are connected to the host 100A.

For example, the computing system 1000A may be assumed to be a server. In another example, the computing system 1000A may be a personal computer (PC), a set-top-box, a modem, a mobile device, or the like. For example, the devices 105 that are connected to the host 100A may include the first through n-th SDs 105-1 through 105-n.

The processor 101 may include a circuit, interfaces, or a program code for processing data and controlling operations of the components of the computing system 1000A. For example, the processor 101 may include a central processing unit (CPU), an advanced risk machine (ARM) processor, or an application specific integrated circuit (ASIC).

The memory 102 may include a static random-access memory (SRAM) or a dynamic random access memory (DRAM), which stores data, commands, or program codes which are necessary for operations of the computing system 1000A. The memory 102 may include a non-volatile memory. The memory 102 may store program codes that operate to execute at least one operating system (OS) and virtual machines (VMs). The memory 102 may also store program codes that execute a hypervisor for managing the VMs.

The processor 101 using the memory 102 may operate to execute the at least one OS and the VMs. The processor 101 may also operate to execute the hypervisor for managing the VMs or to be controlled by the hypervisor. In such a way, the processor 101 may operate to control operations of the components of the computing system 1000A.

The processor 101 may include a software switch that is employed by the hypervisor in order to provide network connectivity between the VMs or connectivity between the VMs and the first through n-th SDs 105-1 through 105-n. The software switch is also called a virtual switch. In an exemplary embodiment, the software switch is an Internet Protocol (IP) application programming interface (API).

The I/O sub-system 103 may include a circuit, interfaces, or a program code capable of operating to perform data communication between the components of the computing system 1000A. The I/O sub-system 103 may include at least one standardized bus and at least one bus controller. Accordingly, the I/O sub-system 103 may recognize devices connected to the bus 106, list the devices connected to the bus 106, and allocate or deallocate resources for various devices connected to the bus 106. In other words, the I/O sub-system 103 may operate to manage communications on the bus 106. For example, the I/O sub-system 103 may be a PCIe system, and may include a PCIe root complex and at least one PCIe switch or bridge. For example, the I/O sub-system 103 may be controlled by the hypervisor.

The HBA 104 connects the first through n-th SDs 105-1 through 105-n to the computing system 1000A. For example, the HBA 104 may include a small computer system interface (SCSI) adaptor, a fiber channel adaptor, a serial advanced technology attachment (ATA) adaptor, or the like. In detail, the HBA 104 may be directly connected to the first through n-th SDs 105-1 through 105-n, which are based on a fiber channel (FC) HBA. The HBA 104 may interface the host 100A with the first through n-th SDs 105-1 through 105-n by being connected to the first through n-th SDs 105-1 through 105-n in a storage network area (SAN) environment.

The HBA 104 may include a single root-I/O virtualization (SR-IOV) function 104-1. For example, the SR-IOV function 104-1 has been developed to improve the I/O performance of a storage device in a server virtualization environment, and directly connects a VM of a server virtualization system to the storage device. Accordingly, in the HBA 104 including the SR-IOV function 104-1, at least one storage device needs to be allocated to a single VM.

For reference, the SR-IOV function 104-1 has a standard that enables a single PCIe physical device under a single root port to be represented as several individual physical devices on a hypervisor or a guest OS. A PCIe device that supports the SR-IOV function 104-1 represents its own several instances on a guest OS and a hypervisor. The number of virtual functions displayed may vary according to devices.

In a virtualization system to which the HBA 104 including the SR-IOV function 104-1 is applied in an exemplary embodiment, the HBA 104 directly connects the VMs with the first through n-th SDs 105-1 through 105-*n*, rather than via a hypervisor.

The first through n-th SDs 105-1 through 105-*n* may be implemented by using solid state drives (SSDs) or hard disk drives (HDDs).

At least one selected from the first through n-th SDs 105-1 through 105-*n* generates a plurality of different pieces of identify device data so that the at least one SD is recognized as a plurality of physical devices. For example, at least one selected from the first through n-th SDs 105-1 through 105-*n* generates the plurality of different pieces of identify device data in response to an identify device command received from the host 100A and transmits the plurality of different pieces of identify device data to the host 100A.

For example, during device recognition, at least one selected from the first through n-th SDs 105-1 through 105-*n* transmits to the host 100A a plurality of pieces of identify device data including different serial numbers and different pieces of world wide name (WWN) information according to virtual storage devices respectively corresponding to a plurality of storage regions into which a storage region of the at least one storage device is divided.

A WWN or a World Wide Identifier (WWID) is a unique identifier used in storage technologies including Fiber Channel, Advanced Technology Attachment (ATA) or Serial Attached SCSI (SAS). A WWN may be employed in a variety of roles, such as a serial number for addressability; for example, in Fiber Channel networks, a WWN may be used as a WWNN (World Wide Node Name) to identify a switch, or a WWPN (World Wide Port Name) to identify an individual port on a switch. In an exemplary embodiment, each WWN is an 8 or 16 byte number, the length and format of which is determined by the most significant four bits, which are referred to as a Network Address Authority (NAA). The remainder of the value is derived from an IEEE OUI (often the term "Company Identifier" is used as a synonym for OUI) and vendor-supplied information. Each format defines a different way to arrange and/or interpret these components.

For example, at least one SD selected from the first through n-th SDs 105-1 through 105-*n* divides a storage region of a physical storage device thereof into a plurality of storage regions, based on an initially-set command, and generates and stores unique identify device data about a virtual storage device corresponding to each of the plurality of storage regions. When receiving the identify device command from the host 100A, the at least one SD selected from the first through n-th SDs 105-1 through 105-*n* generates the plurality of pieces of identify device data based on a plurality of pieces of device identification information and transmits the same to the host 100A.

Accordingly, the least one SD selected from the first through n-th SDs 105-1 through 105-*n* is recognized as a plurality of storage devices by the host 100A even when the at least one storage device is physically a single storage device.

Figure 2:
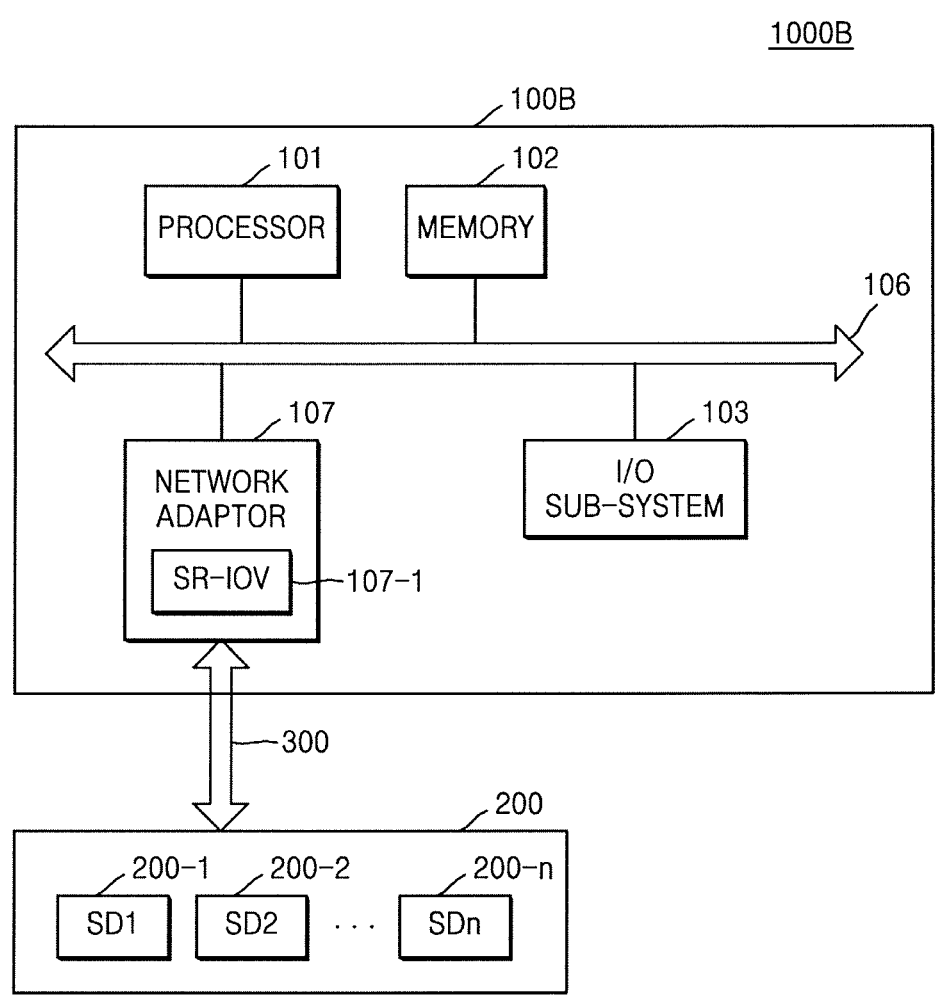
FIG. 2 is a block diagram of a computing system according to an exemplary embodiment of the inventive concept.

FIG. 2 is a block diagram of a computing system 1000B according to an exemplary embodiment of the inventive concept.

Referring to FIG. 2, the computing system 1000B includes a host 100B, network devices 200, and a link unit 300.

The host 100B includes a processor 101, a memory 102, an I/O sub-system 103, a network adaptor 107, and a bus 106. For example, the host 100B may be assumed to be a server. In another example, the host 100B may be a PC, a set-top-box, a modem, a mobile device, or the like. The network adaptor 107 may be a device configured to connect a computer to a computer network. Examples of the network adaptor 107 include a network interface controller, a network interface card, and a LAN adaptor. The network adaptor 107 may include circuitry required to communicate using a specific physical layer and data link layer standard such as Ethernet, Fiber Channel, Wi-Fi, token ring, etc.

Since the processor 101, the memory 102, the I/O sub-system 103, and the bus 106 included in the host 100B have already been described above with reference to the computing system 1000A of FIG. 1, repeated descriptions thereof will be omitted.

The network adaptor 107 may be combined with the network devices 200 via the link unit 300. For example, the link unit 300 may include copper wiring, fiber optic cabling, at least one wireless channel, or a combination thereof.

The network adaptor 107 may include a circuit, interfaces, or a code capable of operating to transmit and receive data according to at least one networking standard. For example, the network adaptor 107 may communicate with the network devices 200 according to at least one Ethernet standard.

The network adaptor 107 includes an SR-IOV function 107-1. For example, the SR-IOV function 107-1 has been developed to improve the I/O performance of a network device in a server virtualization environment, and directly connects a VM of a server virtualization system to the network device. Accordingly, in the network adaptor 107 including the SR-IOV function 107-1, at least one storage device needs to be allocated to a single VM. In an exemplary embodiment, the network adaptor 107 includes a transceiver capable of wirelessly transmitting and receiving data.

In a virtualization system to which the network adaptor 107 including the SR-IOV function 107-1 is applied in an exemplary embodiment, the network adaptor 107 directly connects a VM with a storage device, rather than via a hypervisor.

The network devices 200 may include a plurality of first through n-th SDs 200-1 through 200-*n*. For example, the first through n-th SDs 200-1 through 200-*n* may be implemented by using SSDs or HDDs.

At least one SD selected from the first through n-th SDs 200-1 through 200-*n* generates a plurality of different pieces of identify device data so that the at least one SD is recognized as a plurality of physical devices. For example, at least one SD selected from the first through n-th SDs 200-1 through 200-*n* generates the plurality of different pieces of identify device data in response to an identify device command received from the host 100B and transmits the plurality of different pieces of identify device data to the host 100B.

For example, during device recognition, at least one SD selected from the first through n-th SDs 200-1 through 200-*n* transmits to the host 100B a plurality of pieces of identify device data including different serial numbers and different pieces of WWN information according to virtual storage devices respectively corresponding to a plurality of storage regions into which a storage region of the at least one storage device is divided.

For example, at least one SD selected from the first through n-th SDs 200-1 through 200-n divides a storage region of a physical storage device thereof into a plurality of storage regions, based on an initially-set command, and generates and stores unique identify device data about a virtual storage device corresponding to each of the plurality of storage regions. When receiving the identify device command from the host 100B, the at least one SD selected from the first through n-th SDs 200-1 through 200-n may generate the plurality of pieces of identify device data based on a plurality of pieces of device identification information and transmits the same to the host 100B.

Accordingly, the least one SD selected from the first through n-th SDs 200-1 through 200-n is recognized as a plurality of storage devices by the host 100B even when the at least one storage device is physically a single storage device.

Figure 3:
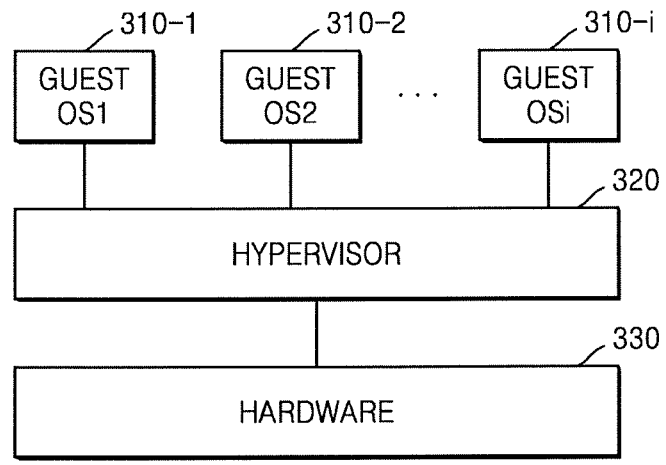
FIG. 3 is a block diagram of a structure of a virtualization system using a bare-metal hypervisor, which is applicable to the inventive concept.

FIG. 3 is a block diagram of a structure of a virtualization system using a bare-metal hypervisor, which is applicable to the inventive concept.

Referring to FIG. 3, a hypervisor 320 is placed on a first upper layer from hardware 330, and first through i-th guest OSs 310-1 through 310-I are placed on an upper layer from the hypervisor 320.

The hypervisor 320 is a logical platform for simultaneously executing many OSs in a single host computer. In other words, the hypervisor 320 is a program for operating a server virtualization system including various OSs provided therein.

The bare-metal hypervisor 320 is installed directly on the hardware 330 and then executed, as an OS controls a program. Then, the first through i-th guest OSs 310-1 through 310-i are executed on a second upper level from the hardware 330. According to this way, connection to a host OS is not necessary, and thus high-speed processing may be provided because overhead for a command conversion is small. In addition, the virtualization system structure is flexible because resources of the hardware 330 are directly controlled.

Figure 4:
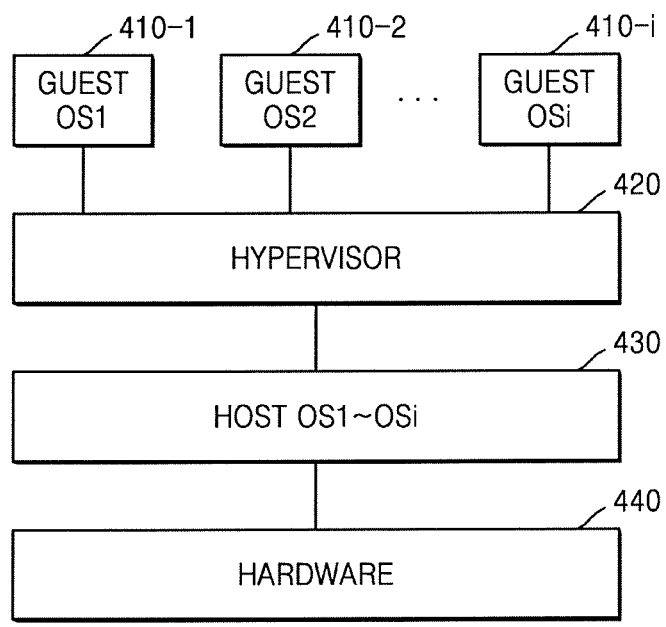
FIG. 4 is a block diagram of a structure of a virtualization system using a hosted hypervisor, which is applicable to the inventive concept.

FIG. 4 is a block diagram of a structure of a virtualization system using a hosted hypervisor, which is applicable to the inventive concept.

Referring to FIG. 4, first through i-th host OSs 430 are placed on a first upper level from hardware 440, a hypervisor 420 is placed on an upper level from the first through i-th host OSs 430, and first through i-th guest OSs 410-1 through 410-i are placed on an upper level from the hypervisor 420.

The hosted hypervisor 420 is executed in the first through i-th host OSs 430, similar to general programs. The first through i-th guest OSs 410-1 through 410-i operating in VMs are executed on a third upper level from the hardware 440. Accordingly, the first through i-th guest OSs 410-1 through 410-i operate over the first through i-th host OSs 430, and thus types of the first through i-th guest OSs 410-1 through 410-i to be used are not restricted. However, overhead increases because the hardware 440 is emulated.

Figure 5:
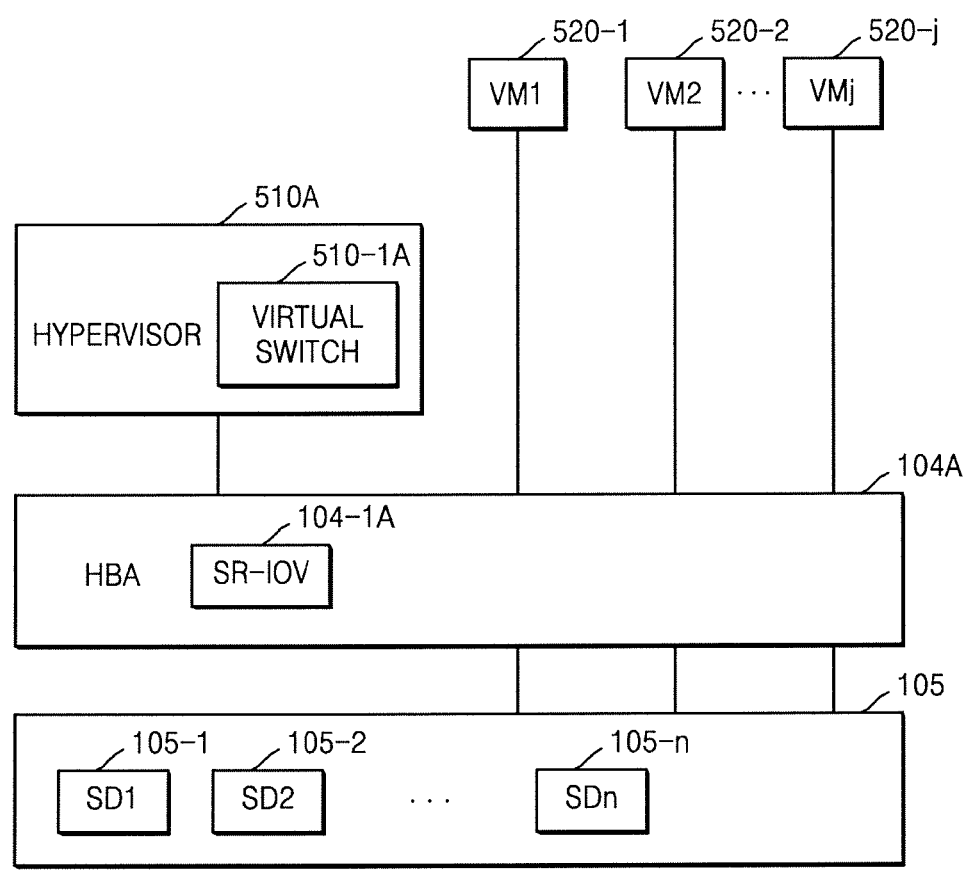
FIG. 5 is a block diagram of a server virtualization system according to an exemplary embodiment of the inventive concept.

FIG. 5 is a block diagram of a server virtualization system 2000A according to an exemplary embodiment of the inventive concept. FIG. 5 illustrates an example of a virtualization environment for the computing system 1000A of FIG. 1.

The server virtualization system 2000A includes a hypervisor 510A, an HBA 104A, first through n-th SDs 105-1 through 105-n, and first through j-th VMs 520-1 through 520-j. The HBA may be circuit board or an integrated circuit adaptor that provides input/output processing and physical connectivity between a server, a storage device, and a network. The HBA may also be referred to as a host adaptor or a host controller.

First, it is assumed that all of the first through j-th VMs 520-1 through 520-j of the server virtualization system 2000A are set to be supported by an SR-IOV function 104-1A included in the HBA 104A.

Referring to FIG. 5, all of the first through j-th VMs 520-1 through 520-j are directly allocated to the first through n-th SDs 105-1 through 105-n by the HBA 104A including the SR-IOV function 104-1A.

The hypervisor 510A is a virtualization engine that processes allocation of resources and SDs to VMs in a virtualization environment. For example, the hypervisor 510A may be implemented by using the bare-metal hypervisor of FIG. 3 or the hosted hypervisor of FIG. 4. The hypervisor 510A includes a virtual switch 510-1A for processing allocation of resources and SDs to VMs. The virtual switch 510-1A may be driven by software.

The HBA 104A including the SR-IOV function 104-1A directly connects the first through j-th VMs 520-1 through 520-j to the first through n-th SDs 105-1 through 105-n. In other words, the HBA 104A directly connects the first through j-th VMs 520-1 through 520-j to the first through n-th SDs 105-1 through 105-n, rather than via the virtual switch 510-1A of the hypervisor 510A. The HBA 104A manages the connections so that at least one SD is allocated to one VM. For example, the HBA 104A manages the connections so that at least one SD corresponding to at least one piece of identify device data is allocated to one VM.

The first through j-th VMs 520-1 through 520-j are generated by a server virtualizing different OSs. For example, the OSs may include Linux, Windows, and the like.

As such, by directly connecting the first through j-th VMs 520-1 through 520-j to SDs with the aid of the SR-IOV function 104-1A without using the virtual switch 510-1A of the hypervisor 510A, scheduling delay before communication is performed may be reduced, and overhead due to an operation of the virtual switch 510-1A may be reduced.

Figure 6:
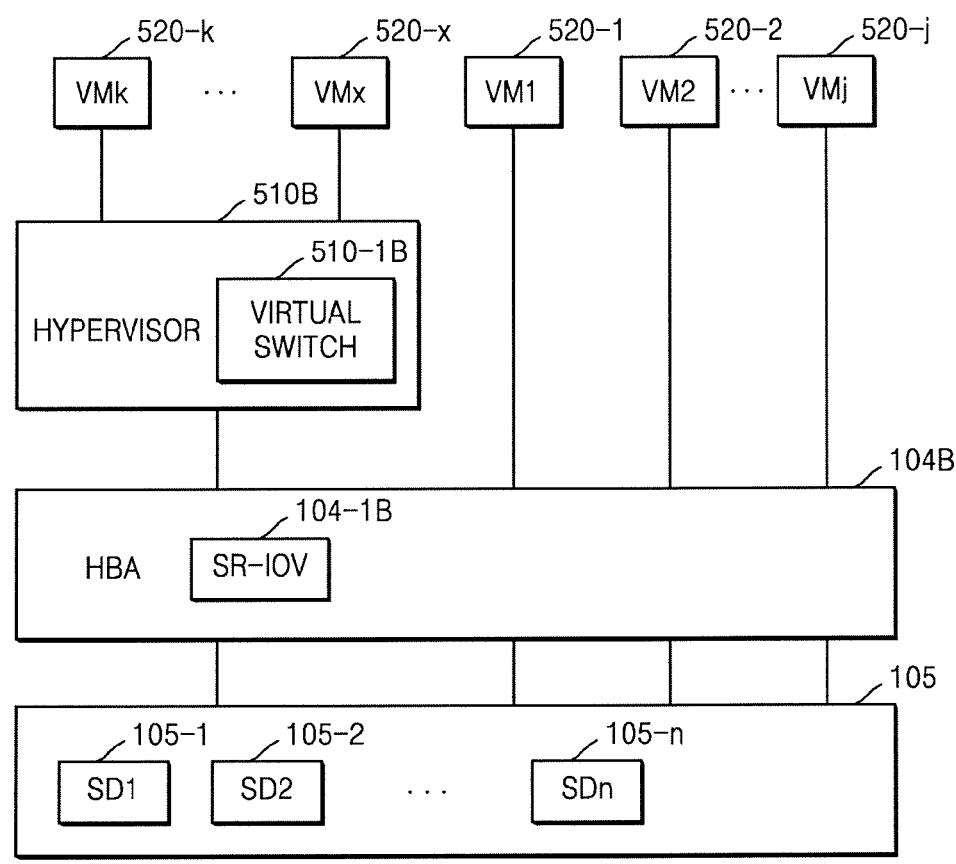
FIG. 6 is a block diagram of a server virtualization system according to an exemplary embodiment of the inventive concept.

FIG. 6 is a block diagram of a server virtualization system 2000B according to an exemplary embodiment of the inventive concept. FIG. 6 illustrates another example of a virtualization environment for the computing system 1000A of FIG. 1.

The server virtualization system 2000B includes a hypervisor 510B, an HBA 104B, first through n-th SDs 105-1 through 105-n, first through x-th VMs 520-1 through 520-x, and first through j-th VMs 520-1 through 520-j.

First, it is assumed that the first through j-th VMs 520-1 through 520-j in a first group are set to be supported by an SR-IOV function 104-1B included in the HBA 104B, and the k-th through x-th VMs 520-k through 520-x in a second group are not supported by the SR-IOV function 104-1B included in the HBA 104B. In other words, SDs which the second group of VMs 520-k through 520-x are to communicate with are selected via a virtual switch 510-1B of the hypervisor 510B.

Referring to FIG. 6, all of the first through j-th VMs 520-1 through 520-j in the first group are directly allocated to the first through n-th SDs 105-1 through 105-n by the HBA 104B including the SR-IOV function 104-1B. The k-th through x-th VMs 520-k through 520-x in the second group are allocated to the first through n-th SDs 105-1 through 105-*n* connected to the HBA 104B, by the virtual switch 510-1B of the hypervisor 510B.

The hypervisor 510B is a virtualization engine that processes allocation of resources and SDs to VMs in a virtualization environment. For example, the hypervisor 510B may be implemented by using the bare-metal hypervisor of FIG. 3 or the hosted hypervisor of FIG. 4. The hypervisor 510B includes the virtual switch 510-1B for processing allocation of resources and SDs to the k-th through x-th VMs 520-*k* through 520-*x* in the second group. The virtual switch 510-1B may be driven by software. In other words, the k-th through x-th VMs 520-*k* through 520-*x* in the second group may be allocated to the first through n-th SDs 105-1 through 105-*n* connected to the HBA 104B, by the virtual switch 510-1B of the hypervisor 510B.

The HBA 104B including the SR-IOV function 104-1B directly connects the first through j-th VMs 520-1 through 520-*j* in the first group to the first through n-th SDs 105-1 through 105-*n*. In other words, the HBA 104B may directly connect the first through j-th VMs 520-1 through 520-*j* in the first group to the first through n-th SDs 105-1 through 105-*n*, rather than via the virtual switch 510-1B of the hypervisor 510B. The HBA 104B manages the connections so that at least one SD is allocated to one VM included in the first through j-th VMs 520-1 through 520-*j* in the first group. For example, the HBA 104B manages the connections so that at least one SD corresponding to at least one piece of identify device data is allocated to one VM.

Each of the first group of first through j-th VMs 520-1 through 520-*j* and the second group of k-th through x-th VMs 520-*k* through 520-*x* may be generated by virtualizing different OSs. For example, the OSs may include Linux, Window, and the like.

As such, by directly connecting the first through j-th VMs 520-1 through 520-*j* in the first group to SDs with the aid of the SR-IOV function 104-1B without using the virtual switch 510-1B of the hypervisor 510B, scheduling delay before communication is performed may be reduced, and overhead due to an operation of the virtual switch 510-1B may be reduced.

For reference, since there is no need to fixedly allocate the first through n-th SDs 105-1 through 105-*n* to the k-th through x-th VMs 520-*k* through 520-*x* in the second group, the number of SDs that are connected to a server may be reduced. For example, there is no need to dedicate one or more the SDs 105-1 through 105-*n* to one of the k-th through x-th VMs 520-*k* through 520-*x*.

Figure 7:
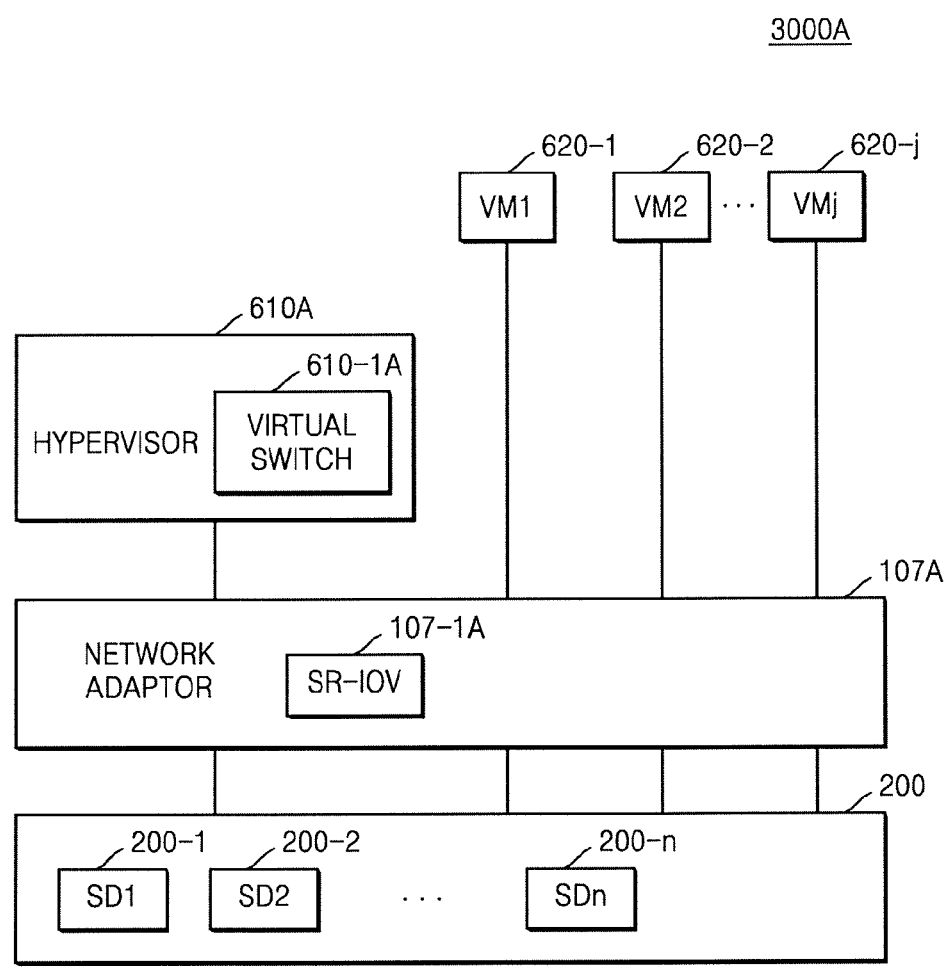
FIG. 7 is a block diagram of a server virtualization system according to an exemplary embodiment of the inventive concept.

FIG. 7 is a block diagram of a server virtualization system 3000A according to an exemplary embodiment of the inventive concept. FIG. 7 illustrates an example of a virtualization environment for the computing system 1000B of FIG. 2.

The server virtualization system 3000A includes a hypervisor 610A, a network adaptor 107A, network devices 200, and first through j-th VMs 620-1 through 620-*j*.

First, it is assumed that all of the first through j-th VMs 620-1 through 620-*j* of the server virtualization system 3000A are set to be supported by an SR-IOV function 107-1A included in the network adaptor 107A.

Referring to FIG. 7, all of the first through j-th VMs 620-1 through 620-*j* are directly allocated to the first through n-th SDs 200-1 through 200-*n* by the network adaptor 107A including the SR-IOV function 107-1A.

The hypervisor 610A is a virtualization engine that processes allocation of resources and SDs to VMs in a virtualization environment. For example, the hypervisor 610A may be implemented by using the bare-metal hypervisor of FIG. 3 or the hosted hypervisor of FIG. 4. The hypervisor 610A includes a virtual switch 610-1A for processing allocation of resources and SDs to VMs. The virtual switch 610-1A may be driven by software.

The network adaptor 107A including the SR-IOV function 107-1A directly connects the first through j-th VMs 620-1 through 620-*j* to the first through n-th SDs 200-1 through 200-*n*. In other words, the network adaptor 107A directly connects the first through j-th VMs 620-1 through 620-*j* to the first through n-th SDs 200-1 through 200-*n*, rather than via the virtual switch 610-1A of the hypervisor 610A. The network adaptor 107A manages the connections so that at least one SD is allocated to one VM. For example, the network adaptor 107A manages the connections so that at least one SD corresponding to at least one piece of identify device data is allocated to one VM.

The first through j-th VMs 620-1 through 620-*j* are generated by a server virtualizing different OSs. For example, the OSs may include Linux, Window, and the like.

As such, by directly connecting the first through j-th VMs 620-1 through 620-*j* to SDs with the aid of the SR-IOV function 107-1A without using the virtual switch 610-1A of the hypervisor 610A, scheduling delay before communication is performed may be reduced, and overhead due to an operation of the virtual switch 610-1A may be reduced.

Figure 8:
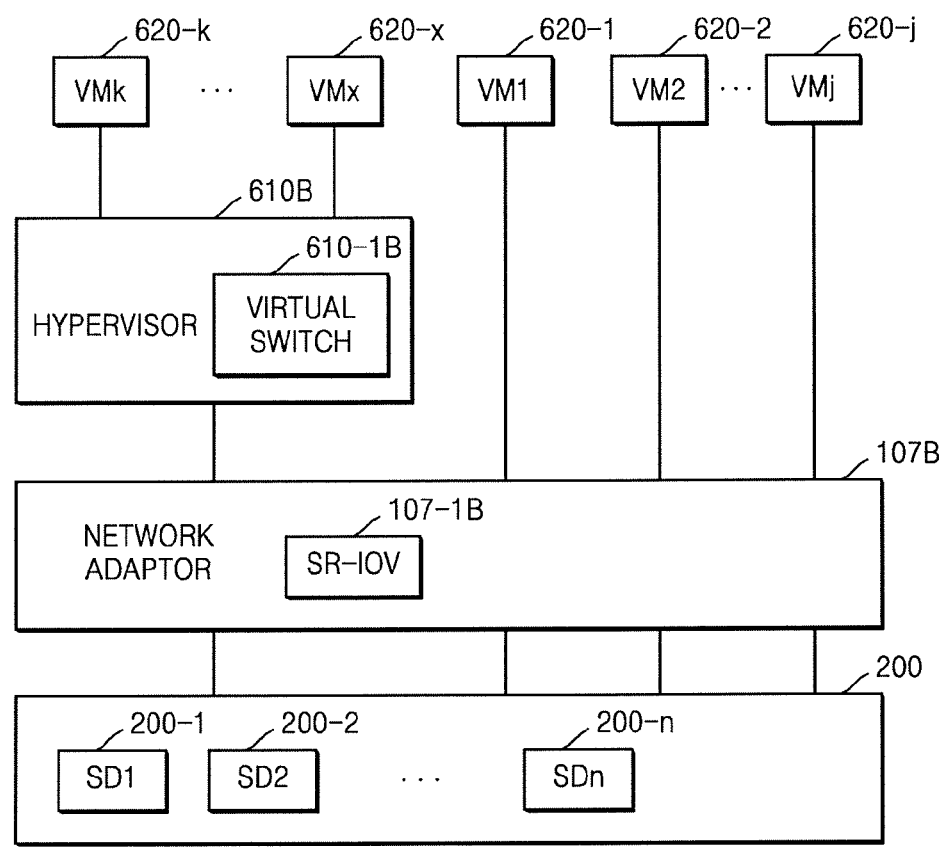
FIG. 8 is a block diagram of a server virtualization system according to an exemplary embodiment of the inventive concept.

FIG. 8 is a block diagram of a server virtualization system 3000B according to an exemplary embodiment of the inventive concept. FIG. 8 illustrates another example of a virtualization environment for the computing system 1000B of FIG. 2.

The server virtualization system 3000B includes a hypervisor 610B, a network adaptor 107B, first through n-th SDs 200-1 through 200-*n*, and first through x-th VMs 620-1 through 620-*x*.

First, it is assumed that the first through j-th VMs 620-1 through 620-*j* in a first group are set to be supported by an SR-IOV function 107-1B included in the network adaptor 107B, and the k-th through x-th VMs 620-*k* through 620-*x* in a second group are not supported by the SR-IOV function 107-1B included in the network adaptor 107B. In other words, SDs which the second group of VMs 620-*k* through 620-*x* are to communicate with are selected via a virtual switch 610-1B of the hypervisor 610B.

Referring to FIG. 8, all of the first through j-th VMs 620-1 through 620-*j* in the first group are directly allocated to the first through n-th SDs 200-1 through 200-*n* by the network adaptor 107B including the SR-IOV function 107-1B. The k-th through x-th VMs 620-*k* through 620-*x* in the second group are allocated to the first through n-th SDs 200-1 through 200-*n* connected to the network adaptor 107B, by the virtual switch 610-1B of the hypervisor 610B.

The hypervisor 610B is a virtualization engine that processes allocation of resources and SDs to VMs in a virtualization environment. For example, the hypervisor 610B may be implemented by using the bare-metal hypervisor of FIG. 3 or the hosted hypervisor of FIG. 4. The hypervisor 610B includes the virtual switch 610-1B for processing allocation of resources and SDs to the k-th through x-th VMs 620-*k* through 620-*x* in the second group. The virtual switch 610-1B may be driven by software. In other words, the k-th through x-th VMs 620-*k* through 620-*x* in the second group may be allocated to the first through n-th SDs 200-1 through 200-*n* connected to the network adaptor 107B, by the virtual switch 610-1B of the hypervisor 610B.

The network adaptor 107B including the SR-IOV function 107-1B directly connects the first through j-th VMs 620-1 through 620-*j* in the first group to the first through n-th SDs 200-1 through 200-*n*. In other words, the network adaptor 107B may directly connect the first through j-th VMs 620-1 through 620-j in the first group to the first through n-th SDs 200-1 through 200-n, rather than via the virtual switch 610-1B of the hypervisor 610B. The network adaptor 107B manages the connections so that at least one SD is allocated to one VM included in the first through j-th VMs 620-1 through 620-j in the first group. For example, the network adaptor 107B manages the connections so that an SD corresponding to at least one piece of identify device data is allocated to one VM included in the first through j-th VMs 620-1 through 620-j in the first group.

Each of the first group of first through j-th VMs 620-1 through 620-j and the second group of k-th through x-th VMs 620-k through 620-x may be generated by virtualizing different OSs. For example, the OSs may include Linux, Window, and the like.

As such, by directly connecting the first through j-th VMs 620-1 through 620-j in the first group to SDs with the aid of the SR-IOV function 107-1B without using the virtual switch 610-1B of the hypervisor 610B, scheduling delay before communication is performed may be reduced, and overhead due to an operation of the virtual switch 610-1B may be reduced.

For reference, since there is no need to fixedly allocate the first through n-th SDs 200-1 through 200-n to the k-th through x-th VMs 620-k through 620-x in the second group, the number of SDs that are connected to a server may be reduced.

Figure 9:
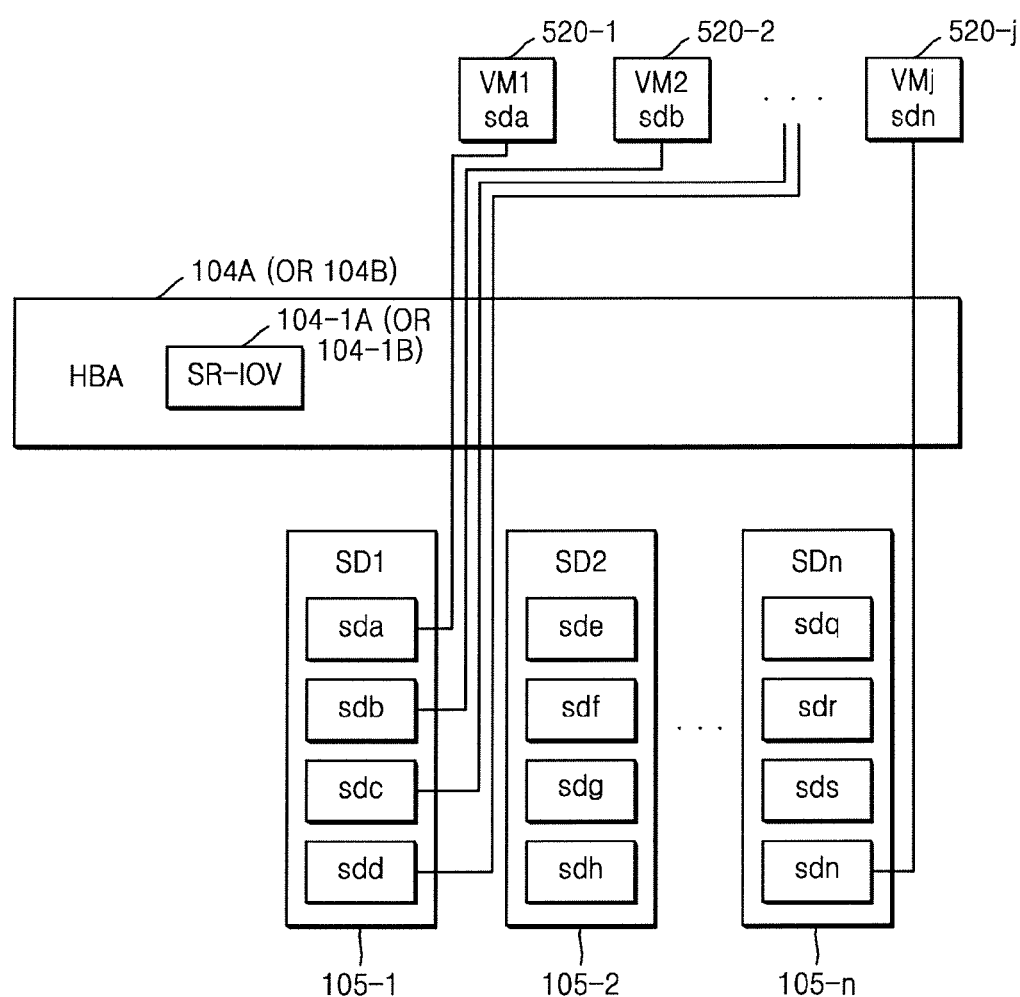
FIG. 9 illustrates direct allocation of storage devices (SDs) to virtual machines (VMs) in the server virtualization system of FIG. 5 or 6.

FIG. 9 illustrates direct allocation of SDs to VMs in the server virtualization system 2000A or 2000B of FIG. 5 or 6.

Referring to FIG. 9, at least one SD selected from the first through n-th SDs 105-1 through 105-n transmits to a host a plurality of different pieces of identify device data in response to an identify device command received from the host.

For example, each of the first through n-th SDs 105-1 through 105-n divides a storage region of itself into four storage regions and transmits to the host four pieces of identify device data including different serial numbers and different pieces of WWN information according to the four storage regions.

For example, the first SD 105-1 divides a storage region thereof into four storage regions and transmits to the host four pieces of identify device data including different serial numbers and different pieces of WWN information according to the four storage regions. Accordingly, the first SD 105-1 is recognized as four SDs sda, sdb, sdc, and sdd by the host. For example, a first storage region obtained by dividing the storage region of the first SD 105-1 may be recognized as the SD sda, a second storage region obtained by dividing the storage region of the first SD 105-1 may be recognized as the SD sdb, a third storage region obtained by dividing the storage region of the first SD 105-1 may be recognized as the SD sdc, and a fourth storage region obtained by dividing the storage region of the first SD 105-1 may be recognized as the SD sdd.

The other SDs, namely, the second through n-th SDs 105-2 through 105-n, may each generate a plurality of different pieces of identify device data and transmit the same to the host according to the same method as used for the first SD 105-1, and thus may each be recognized as a plurality of SDs.

Although identify device data is generated in the embodiment of FIG. 9 so that one SD is recognized as four SDs, embodiments of the inventive concept are not limited thereto, and identify device data may be generated so that one SD is recognized as at least two SDs, less than four SDs, or more than four SDs.

The HBA 104A or 104B allocates at least one SD to the first through j-th VMs 520-1 through 520-j by using the SR-IOV function 104-1A or 104-1B. For example, the HBA 104A or 104B may allocate at least one SD to the first through j-th VMs 520-1 through 520-j by using identify device data received from the first through n-th SDs 105-1 through 105-n during data recognition. For example, SD allocation information may be stored in the HBA 104A or 104B. The SD allocation information may indicate how SDs or portions thereof are allocated (mapped) to each virtual machine.

Referring to FIG. 9, for example, the SD sda corresponding to the first storage region of the first SD 105-1 may be allocated to the first VM 520-1, and the SD sdb corresponding to the second storage region of the first SD 105-1 may be allocated to the second VM 520-2. The SD sdc corresponding to the third storage region of the first SD 105-1 and the SD sdd corresponding to the fourth storage region thereof may be respectively allocated to different VMs.

Thus, in the server virtualization system 2000A or 2000B including the HBA 104A or 104B including the SR-IOV function 104-1A or 104-1B, although the number of VMs greatly increases, the number of necessary physical SDs may be reduced.

Figure 10:
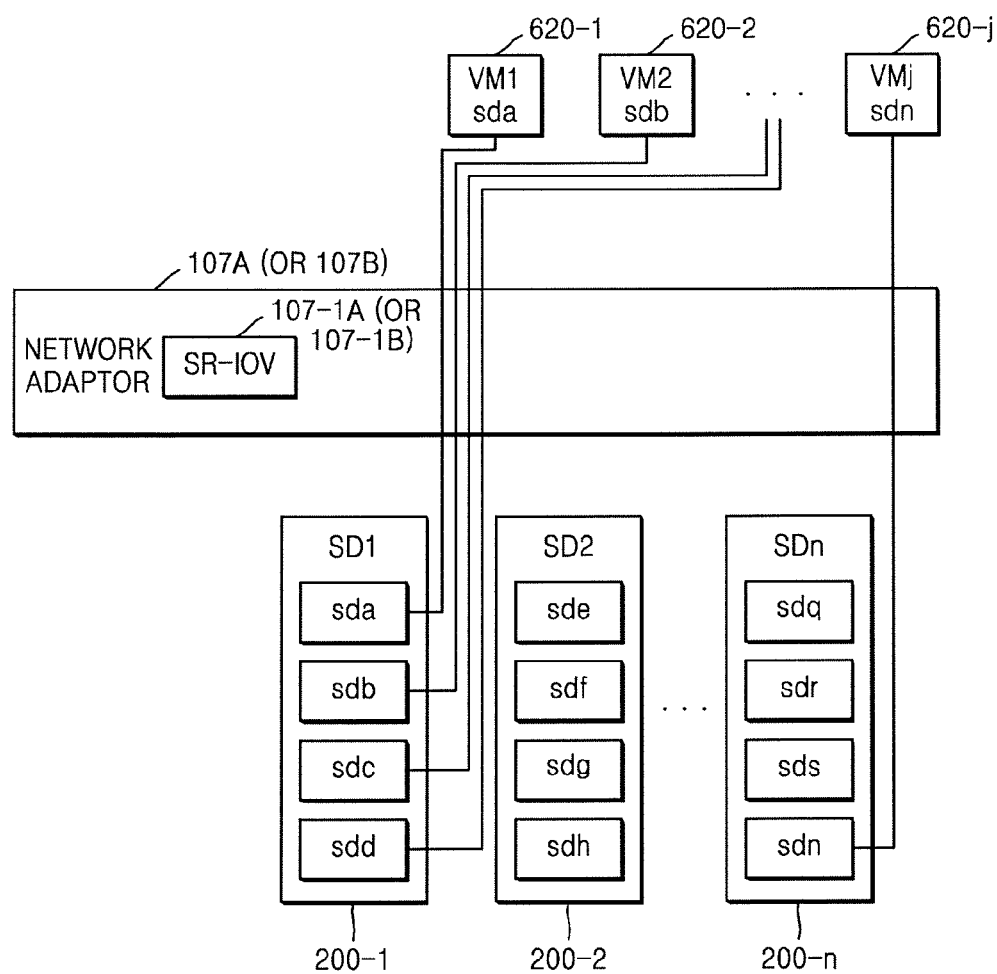
FIG. 10 illustrates direct allocation of SDs to VMs in the server virtualization system of FIG. 7 or 8.

FIG. 10 illustrates direct allocation of SDs to VMs in the server virtualization system 3000A or 3000B of FIG. 7 or 8.

Referring to FIG. 10, at least one SD selected from the first through n-th SDs 200-1 through 200-n transmits to a host a plurality of different pieces of identify device data in response to an identify device command received from the host.

For example, each of the first through n-th SDs 200-1 through 200-n divides a storage region of itself into four storage regions and transmits to the host four pieces of identify device data including different serial numbers and different pieces of WWN information according to the four storage regions.

Since a method in which each of the first through n-th SDs 200-1 through 200-n generate a plurality of pieces of identify device data is the same as that in which each of the first through n-th SDs 105-1 through 105-n of FIG. 9 generate a plurality of pieces of identify device data, a repeated description thereof will be omitted.

Although identify device data is generated in the embodiment of FIG. 10 so that one SD is recognized as four SDs, embodiments of the inventive concept are not limited thereto, and identify device data may be generated so that one SD is recognized as at least two SDs, less than four SDs, or more than four SDs.

The network adaptor 107A or 107B allocates at least one SD to the first through j-th VMs 620-1 through 620-j by using the SR-IOV function 107-1A or 107-1B. For example, the network adaptor 107A or 107B may allocate at least one SD to the first through j-th VMs 620-1 through 620-j by using identify device data received from the first through n-th SDs 200-1 through 200-n during data recognition. For example, SD allocation information may be stored in the network adaptor 107A or 107B.

Referring to FIG. 10, for example, an SD sda corresponding to a first storage region of the first SD 200-1 may be allocated to the first VM 620-1, and an SD sdb corresponding to a second storage region of the first SD 200-1 may be allocated to the second VM 620-2. An SD sdc corresponding to a third storage region of the first SD 200-1 and an SD sdd corresponding to a fourth storage region thereof may be respectively allocated to different VMs.

Thus, in the server virtualization system 3000A or 3000B including the network adaptor 107A or 107B including the SR-IOV function 107-1A or 107-1B, although the number of VMs greatly increases, the number of necessary physical SDs may be reduced.

Figure 11:
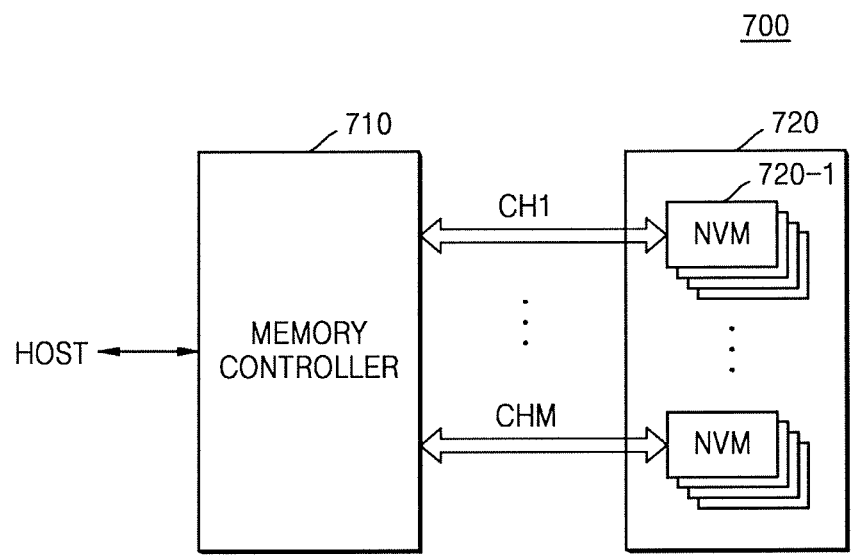
FIG. 11 is a block diagram of an SD according to an exemplary embodiment of the inventive concept.

FIG. 11 is a block diagram of an SD 700 according to an exemplary embodiment of the inventive concept.

For example, the SD 700 of FIG. 11 may be implemented by using the first through n-th SDs 105-1 through 105-n of the computing system 1000A of FIG. 1 or the first through n-th SDs 200-1 through 200-n of the computing system 1000B of FIG. 2.

Referring to FIG. 11, the SD 700 may include a memory controller 710 and a memory device 720. For example, the SD 700 may be implemented by using an SSD.

The memory controller 710 may control the memory device 720 according to a command received from a host. In detail, the memory controller 710 may provide an address, a command, and a control signal to the memory device 720 via a plurality of channels CH1 through CHM to control a program (or write) operation, a read operation, and an erase operation with respect to the memory device 720.

The memory controller 710 may set one physical SD to be a plurality of virtual SDs. In detail, the memory controller 710 may generate a plurality of pieces of identify device (ID) data ID_DATA (see FIG. 21) for one physical SD.

The memory controller 710 divides a storage region of the memory device 720 into a plurality of storage regions that are initially set, and generates unique identify device data ID_DATA for a virtual SD corresponding to each of the plurality of initially-set storage regions. The memory controller 710 also generates an address signal, a command signal, and a control signal that are necessary for writing a plurality of pieces of identify device data respectively generated for the plurality of storage regions to the memory device 720. The memory controller 710 also generates an address signal, a command signal, and a control signal that are necessary for writing information about a storage capacity and a physical address region for each virtual SD to the memory device 720.

For example, the memory controller 710 may generate a plurality of pieces of identify device data so that one physical SD is recognized as a plurality of SDs, based on a device virtualization command that is initially set. The memory controller 710 may control the generated plurality of pieces of identify device data to be written to the memory device 720.

For example, the device virtualization command may be provided to the memory controller 710 via a manufacturer management tool during an SD manufacturing process. In another example, the device virtualization command may be provided to the memory controller 710 via the host, in a user condition where an SD has been connected to the host.

In detail, the processor 101 of the computing system 1000A of FIG. 1 may provide the device virtualization command to the memory controller 710 via the HBA 104. The processor 101 of the computing system 1000B of FIG. 2 may provide the device virtualization command to the memory controller 710 via the network adaptor 107.

In another example, after a plurality of pieces of identify device data for a plurality of virtual SDs corresponding to one physical SD are generated in a manufacturer management tool, the generated plurality of pieces of identify device data may be provided directly to the memory controller 710.

The memory controller 710 may control the received plurality of pieces of identify device data to be written to the memory device 720.

For example, identify device data for each virtual SD may include at least one of information about a model name, a firmware revision, a serial number, a WWN, a physical logical sector size, a feature, and the like based on the Serial Advanced Technology Attachment (SATA) standard.

At least the information about the serial number and the WWN from among the pieces of information included in the identify device data for each virtual SD may be set differently according to different pieces of identify device data.

For example, it is assumed that a plurality of pieces of identify device data for a plurality of virtual SDs corresponding to one physical SD are ID_DATA(1), ID_DATA(2), ID_DATA(3), and ID_DATA(4). For example, each of the pieces of identify device data ID_DATA(1), ID_DATA(2), ID_DATA(3), and ID_DATA(4) may include information about a model name, a firmware revision, a serial number, a WWN, a physical logical sector size, a feature, and the like. In this case, pieces of information about the serial numbers respectively included in the pieces of identify device data ID_DATA(1), ID_DATA(2), ID_DATA(3), and ID_DATA(4) may be set differently, and pieces of information about the WWNs respectively included in the pieces of identify device data ID_DATA(1), ID_DATA(2), ID_DATA(3), and ID_DATA(4) may also be set differently.

For example, when one physical SD is divided into N (where N is an integer equal to or greater than 2) virtual SDs, the storage capacity of each virtual SD is set to be a capacity obtained by dividing a maximum logical block address (LBA) of the physical SD by N. Accordingly, a storage capacity and a physical address region for each virtual SD are set.

As such, when the memory controller 710 receives an identify device command from the host after setting the plurality of pieces of identify device data, the memory controller 710 transmits the plurality of pieces of identify device data to the host. In detail, the memory controller 710 reads the plurality of pieces of identify device data from the memory device 720 and transmits the read plurality of pieces of identify device data to the host.

For example, when the number of virtual SDs corresponding to one physical SD is set to be 4, the memory controller 710 transmits four pieces of identify device data to the host. For example, the memory controller 710 may transmit four pieces of identify device data ID_DATA(1), ID_DATA(2), ID_DATA(3), and ID_DATA(4) to the host.

The memory device 720 may include at least one non-volatile memory chip 720-1. For example, the non-volatile memory chip 720-1 included in the memory device 720 may be not only a flash memory chip, but may also be a phase change RAM (PRAM) chip, a ferroelectric RAM (FRAM) chip, a magnetic RAM (MRAM) chip, or the like. In another example, the memory device 720 may include at least one non-volatile memory chip and at least one volatile memory chip, or may include at least two types of non-volatile memory chips.

For example, the host and the SD 700 may communicate with each other based on SATA frame information structure (FIS) layouts of FIGS. 25A and 25B.

FIG. 25A illustrates an SATA FIS layout when the host transmits information to the SD 700, and FIG. 25B illustrates an SATA FIS layout when the SD 700 transmits information to the host.

In each of the SATA FIS layouts of FIGS. 25A and 25B, a PM Port is a field indicating a device port address, and is set by the host.

For example, when serial numbers respectively included in pieces of identify device data are different and WWNs respectively included therein are also different, the PM Port varies. Accordingly, each of a plurality of virtual SDs that constitute the single physical SD 700 may have a unique PM Port when communicating with the host.

The memory controller 710 of the SD 700 may calculate a physical address of the memory device 720 by using PM Port information and LBA information. In detail, the memory controller 710 may select a virtual SD, based on the PM Port information, and transform an LBA into a physical address, based on a storage capacity and a physical address region for the selected virtual SD.

Figure 12:
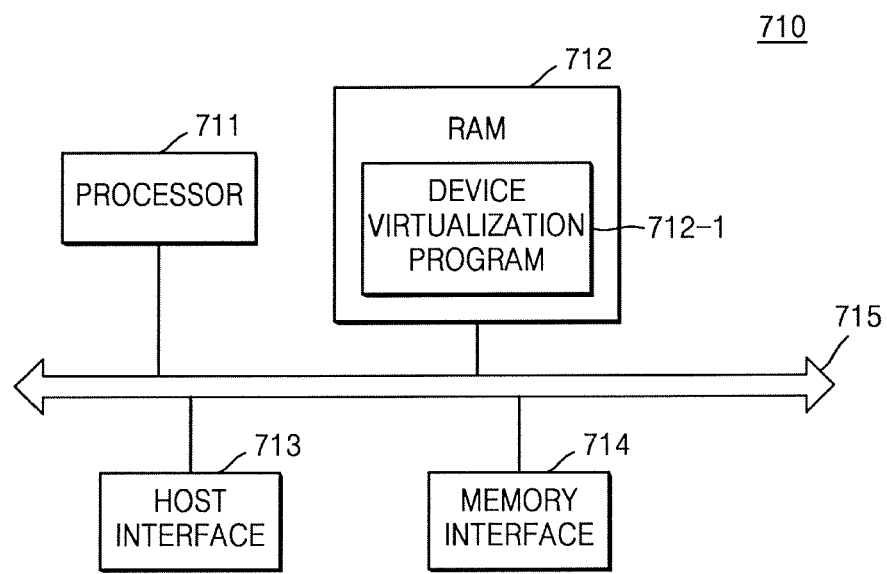
FIG. 12 is a block diagram illustrating a detailed structure of a memory controller included in the SD illustrated in FIG. 11.

FIG. 12 is a block diagram illustrating a detailed structure of the memory controller 710 illustrated in FIG. 11.

As shown in FIG. 12, the memory controller 710 includes a processor 711, a random access memory (RAM) 712, a host interface 713, a memory interface 714, and a bus 715.

The components of the memory controller 710 are electrically connected to each other via the bus 715.

The processor 711 may control an overall operation of the SD 700 by using program codes and pieces of data that are stored in the RAM 712. When the SD 700 is initialized, the processor 711 may read from the memory device 720 a program code and data which are necessary for controlling operations performed by the SD 700, and may load the read program code and data into the RAM 712.

For example, the processor 711 may read from the memory device 720 a device virtualization program 712-1 or identify device data and load the read device virtualization program 712-1 or identify device data into the RAM 712.

For example, the processor 711 loads one piece of identify device data into the RAM 712 before executing the device virtualization program 712-1. After executing the device virtualization program 712-1, the processor 711 loads a plurality of pieces of identify device data into the RAM 712.

When the processor 711 receives the device virtualization command via the host interface 713, the processor 711 sets one physical SD to be a plurality of virtual SDs. For example, the processor 711 may set a plurality of pieces of identify device data for one physical SD.

For example, when receiving the identify device command, the processor 711 may read the plurality of pieces of identify device data from the RAM 712 and transmit the same to the host via the host interface 713.

The RAM 712 stores data that is received via the host interface 713 or data that is received from the memory device 720 via the memory interface 714. The RAM 712 may also store data that has been processed by the processor 711. For example, the RAM 712 may store the plurality of pieces of identify device data set in response to the device virtualization command.

The host interface 713 includes a protocol for exchanging data with a host that is connected to the memory controller 710, and interfaces the memory controller 710 with the host. The host interface 713 may be implemented by using, but is not limited to, an Advanced Technology Attachment (ATA) interface, a Serial Advanced Technology Attachment (SATA) interface, a Parallel Advanced Technology Attachment (PATA) interface, a Universal Serial Bus (USB) or Serial Attached Small Computer System (SAS) interface, a Small Computer System Interface (SCSI), an embedded Multi Media Card (eMMC) interface, or a Universal Flash Storage (UFS) interface. The host interface 713 may receive a command, an address, and data from the host under the control of the processor 711 or may transmit data to the host.

The memory interface 714 is electrically connected to the memory device 720. The memory interface 714 may transmit a command, an address, and data to the memory device 720 under the control of the processor 711 or may receive data from the memory device 720. The memory interface 714 may be configured to support NAND flash memory or NOR flash memory. The memory interface 714 may be configured to perform software or hardware interleaving operations via a plurality of channels.

Figure 13:
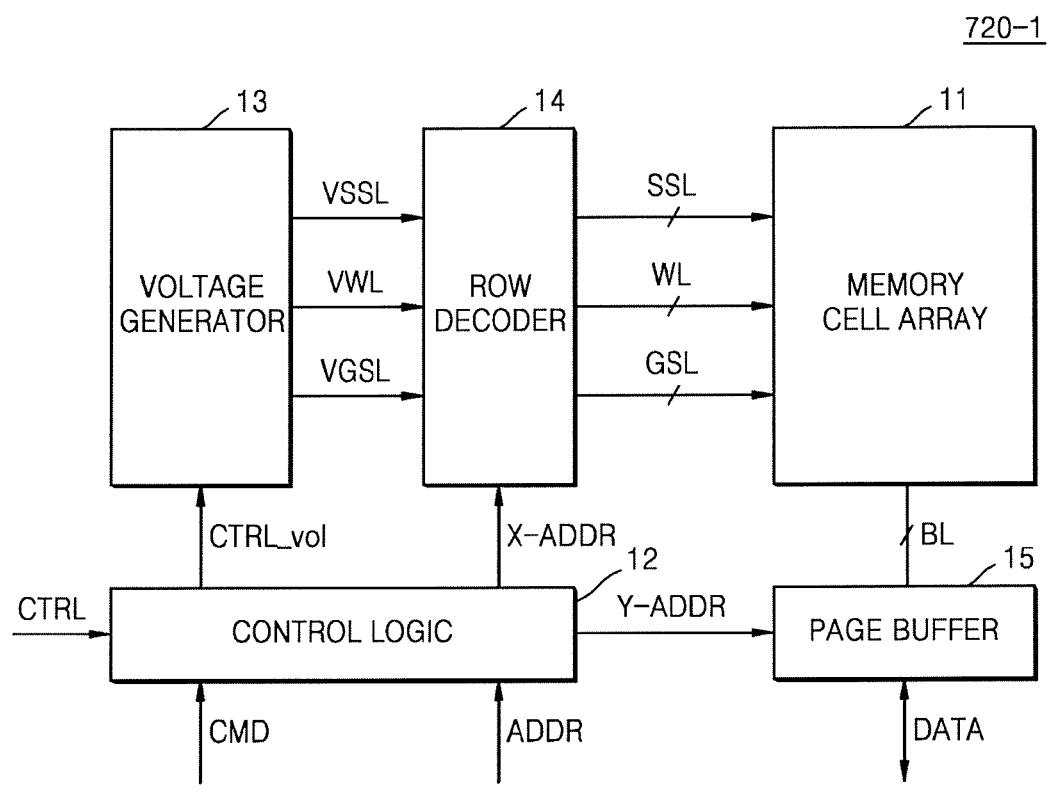
FIG. 13 is a block diagram illustrating a detailed structure of a non-volatile memory chip included in a memory device included in the SD of FIG. 11.

FIG. 13 is a block diagram illustrating a detailed structure of the non-volatile memory chip 720-1 included in the memory device 720 of FIG. 11. For example, the non-volatile memory chip 720-1 may be a flash memory chip.

Referring to FIG. 13, the non-volatile memory chip 720-1a may include a memory cell array 11, a control logic 12, a voltage generator 13, a row decoder 14, and a page buffer 15. The components included in the non-volatile memory chip 720-1 will now be described in detail.

The memory cell array 11 may be connected to at least one string selection line SSL, a plurality of word lines WL, and at least one ground selection line GSL, and may also be connected to a plurality of bit lines BL. The memory cell array 11 may include a plurality of memory cells MC (see FIGS. 15, 16, and 18) that are disposed at intersections of the plurality of bit lines BL and the plurality of word lines WL.

When an erasure voltage is applied to the memory cell array 11, the plurality of memory cells MC enter an erasure state. When a programming voltage is applied to the memory cell array 11, the plurality of memory cells MC enter a program state. At this time, each memory cell MC may have one selected from an erasure state and first through n-th program states P1 through Pn that are distinguished from each other according to a threshold voltage.

In the first through n-th program states P1 through Pn, n may be a natural number equal to or greater than 2. For example, when each memory cell MC is a 2-bit level cell, n may be 3. In another example, when each memory cell MC is a 3-bit level cell, n may be 7. In another example, when each memory cell MC is a 4-bit level cell, n may be 15. As such, the plurality of memory cells MC may include multi-level cells. However, embodiments of the inventive concept are not limited thereto, and the plurality of memory cells MC may include single-level cells.

The control logic 12 may receive a command signal CMD, an address signal ADDR, and a control signal CTRL from the memory controller 710 to output various control signals for writing the data DATA to the memory cell array 11 or for reading the data from the memory cell array 11. In this way, the control logic 12 may control overall operations of the non-volatile memory chip 720-1.

The various control signals output by the control logic 12 may be provided to the voltage generator 13, the row decoder 14, and the page buffer 15. In detail, the control logic 12 may provide a voltage control signal CTRL_vol to the voltage generator 13, may provide a row address signal X_ADDR to the row decoder 14, and may provide a column address signal Y_ADDR to the page buffer 15.

The voltage generator 13 may receive the voltage control signal CTRL_vol to generate various voltages for executing a program operation, a read operation and an erasure operation with respect to the memory cell array 11. In detail, the voltage generator 13 may generate a first drive voltage VWL for driving the plurality of word lines WL, a second drive voltage VSSL for driving the at least one string selection line SSL, and a third drive voltage VGSL for driving the at least one ground selection line GSL.

The first drive voltage signal VWL may be a program (or write) voltage signal, a read voltage signal, an erasure voltage signal, a pass voltage, or a program verification voltage signal. The second drive voltage signal VSSL may be a string selection voltage signal, namely, an on voltage signal or an off voltage signal. The third drive voltage signal VGSL may be a ground selection voltage signal, namely, an on voltage signal or an off voltage signal.

According to an exemplary embodiment, the voltage generator 13 receives the voltage control signal CTRL_vol to generate a program start voltage signal as a program voltage signal, when a program loop starts, namely, when the number of program loops performed is 1. As the number of program loops performed increases, the voltage generator 13 may generate a voltage signal that increases from the program start voltage signal by a step voltage in stages, as the program voltage signal.

The row decoder 14 may be connected to the memory cell array 11 through the plurality of word lines WL and may activate some of the plurality of word lines WL in response to the row address signal X_ADDR received from the control logic 12. In detail, during a read operation, the row decoder 14 may apply a read voltage signal to a word line selected from the plurality of word lines WL and apply a pass voltage signal to the remaining unselected word lines.

During a program operation, the row decoder 14 may apply a program voltage signal to the selected word line and apply the pass voltage signal to the unselected word lines. According to the exemplary embodiment, the row decoder 14 applies a program voltage signal to the selected word line and an additionally selected word line, in at least one selected from a plurality of program loops.

The page buffer 15 may be connected to the memory cell array 11 via the plurality of bit lines BL. In detail, during a read operation, the page buffer 15 may operate as a sense amplifier so as to output data DATA stored in the memory cell array 11. During a program operation, the page buffer 15 may operate as a write driver so as to input the data DATA desired to be stored in the memory cell array 11.

Figure 14:
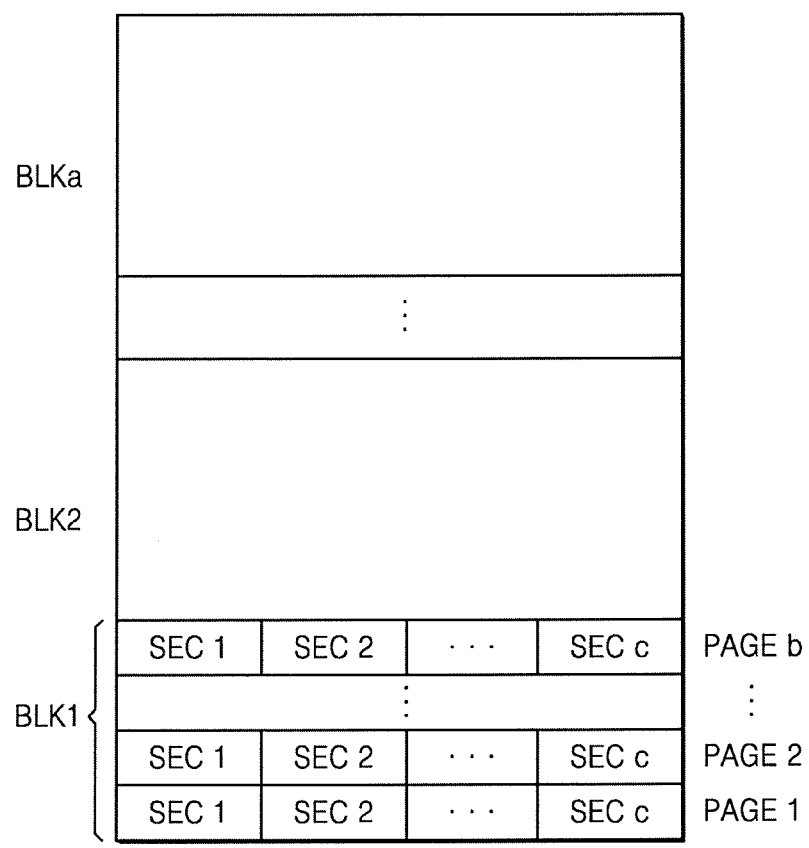
FIG. 14 is a schematic view illustrating a memory cell array included in the memory device illustrated in FIG. 13.

FIG. 14 is a schematic view illustrating the memory cell array 11 of FIG. 13.

Referring to FIG. 14, the memory cell array 11 may be a flash memory cell array. In this case, the memory cell array 11 may include a plurality of memory blocks BLK1, . . . , and BLKa (where "a" denotes a positive integer which is equal to or greater than two) and each of the memory blocks BLK1, . . . , and BLKa may include a plurality of pages PAGE1, . . . , and PAGEb (where "b" denotes a positive integer which is equal to or greater than two). In addition, each of the pages PAGE1, . . . , and PAGEb may include a plurality of sectors SEC1, . . . , and SECc (where "c" denotes a positive integer which is equal to or greater than two). Although the pages PAGE1 through PAGEb and the sectors SEC1 through SECc of only the memory block BLK1 are illustrated for convenience of explanation in FIG. 15, the other memory blocks BLK2 through BLKa may have the same structures as that of the memory block BLK1.

Figure 15:
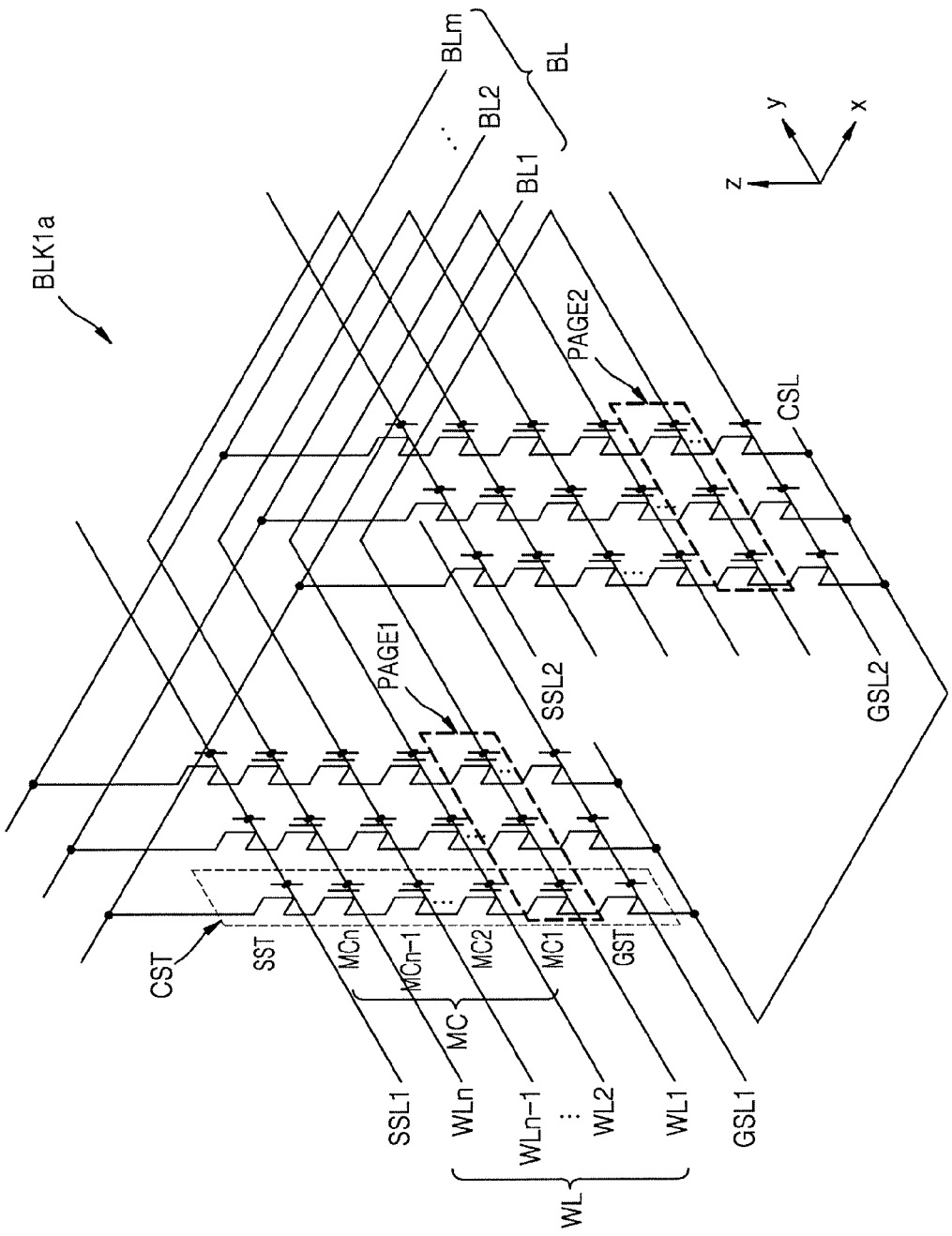
FIG. 15 is an equivalent circuit diagram of a first memory block included in the memory cell array of FIG. 13.

FIG. 15 is an equivalent circuit diagram illustrating a first memory block BLK1a, which is an example of the memory block BLK1 included in the memory cell array 11 of FIG. 14.

Referring to FIG. 15, the first memory block BLK1a may be a NAND flash memory having a vertical structure. Each of the memory blocks BLK1 through BLKa of FIG. 14 may have substantially the same configuration as illustrated in FIG. 15. In FIG. 15, a first direction is referred to as an x direction, a second direction is referred to as a y direction, and a third direction is referred to as a z direction. However, embodiments of the inventive concept are not limited thereto, and the first through third directions may vary.

The first memory block BLK1a may include a plurality of cell strings CST, a plurality of word lines WL, a plurality of bit lines BL, a plurality of ground selection lines GSL1 and GSL2, a plurality of string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary according to embodiments.

Each of the cell strings CST may include a string selection transistor SST, a plurality of memory cells MC, and a ground selection transistor GST that are serially connected to each other between a bit line BL corresponding to the cell string CST and the common source line CSL. However, embodiments of the inventive concept are not limited thereto. According to another embodiment, each cell string CST further includes at least one dummy cell. According to another embodiment, each cell string CST includes at least two string selection transistors SST or at least two ground selection transistors GST.

Each cell string CST may extend in the third direction (z direction). In detail, each cell string CST may extend on a substrate 810 (see FIG. 16) in a vertical direction (z direction). Accordingly, the first memory block BLK1a including the cell strings CST may be referred to as a vertical-direction NAND flash memory. As such, by extending each cell string CST in the vertical direction (z direction) on a substrate, the integration density of the memory cell array 11 may increase.

The plurality of word lines WL may each extend in the first direction x and the second direction y, and each word line WL may be connected to memory cells MC corresponding to itself. Accordingly, a plurality of memory cells MC arranged adjacent to each other on the same plane in the first direction x and the second direction y may be connected to each other by an identical word line WL. In detail, each word line WL may be connected to gates of memory cells MC to control the memory cells MC. In this case, the plurality of memory cells MC may store data and may be programmed, read, or erased under the control of the connected word line WL.

The plurality of bit lines BL may extend in the first direction x and may be connected to the string selection transistors SST. Accordingly, a plurality of string selection transistors SST arranged adjacent to each other in the first direction x may be connected to each other by an identical bit line BL. In detail, each bit line BL may be connected to drains of the plurality of string selection transistors SST.

The plurality of string selection lines SSL1 and SSL2 may each extend in the second direction y and may be connected to the string selection transistors SST. Accordingly, a plurality of string selection transistors SST arranged adjacent to each other in the second direction y may be connected to each other by an identical string selection line SSL1 or SSL2. In detail, each string selection line SSL1 or SSL2 may be connected to gates of the plurality of string selection transistors SST to control the plurality of string selection transistors SST.

The plurality of ground selection lines GSL1 and GSL2 may each extend in the second direction y and may be connected to the ground selection transistors GST. Accordingly, a plurality of ground selection transistors GST arranged adjacent to each other in the second direction y may be connected to each other by an identical ground selection line GSL1 or GSL2. In detail, each ground selection line GSL1 or GSL2 may be connected to gates of the plurality of ground selection transistors GST to control the plurality of ground selection transistors GST.

The ground selection transistors GST respectively included in the cell strings CST may be connected to each other by the common source line CSL. In detail, the common source line CSL may be connected to sources of the ground selection transistors GST.

A plurality of memory cells MC connected to an identical word line WL and to an identical string selection line SSL1 or SSL2 and arranged adjacent to each other in the second direction y may be referred to as a page PAGE. For example, a plurality of memory cells MC connected to a first word line WL1 and to a first string selection line SSL1 and arranged adjacent to each other in the second direction y may be referred to as a first page PAGE1. A plurality of memory cells MC connected to the first word line WL1 and to a second string selection line SSL2 and arranged adjacent to each other in the second direction y may be referred to as a second page PAGE2.

To perform a program operation with respect to a memory cell MC, 0V may be applied to a bit line BL, an on voltage may be applied to a string selection line SSL, and an off voltage may be applied to a ground selection line GSL. The on voltage may be equal or greater than the threshold voltage so that a string selection transistor SST is turned on, and the off voltage may be smaller than the threshold voltage so that the ground selection transistor GST is turned off. A program voltage may be applied to a memory cell selected from the memory cells MC, and a pass voltage may be applied to the remaining unselected memory cells. In response to the program voltage, electric charges may be injected into the memory cells MC due to F-N tunneling. The pass voltage may be greater than the threshold voltage of the memory cells MC.

To perform an erasure operation with respect to the memory cells MC, an erasure voltage may be applied to the body of the memory cells MC, and 0V may be applied to the word lines WL. Accordingly, data stored in the memory cells MC may be temporarily erased.

Figure 16:
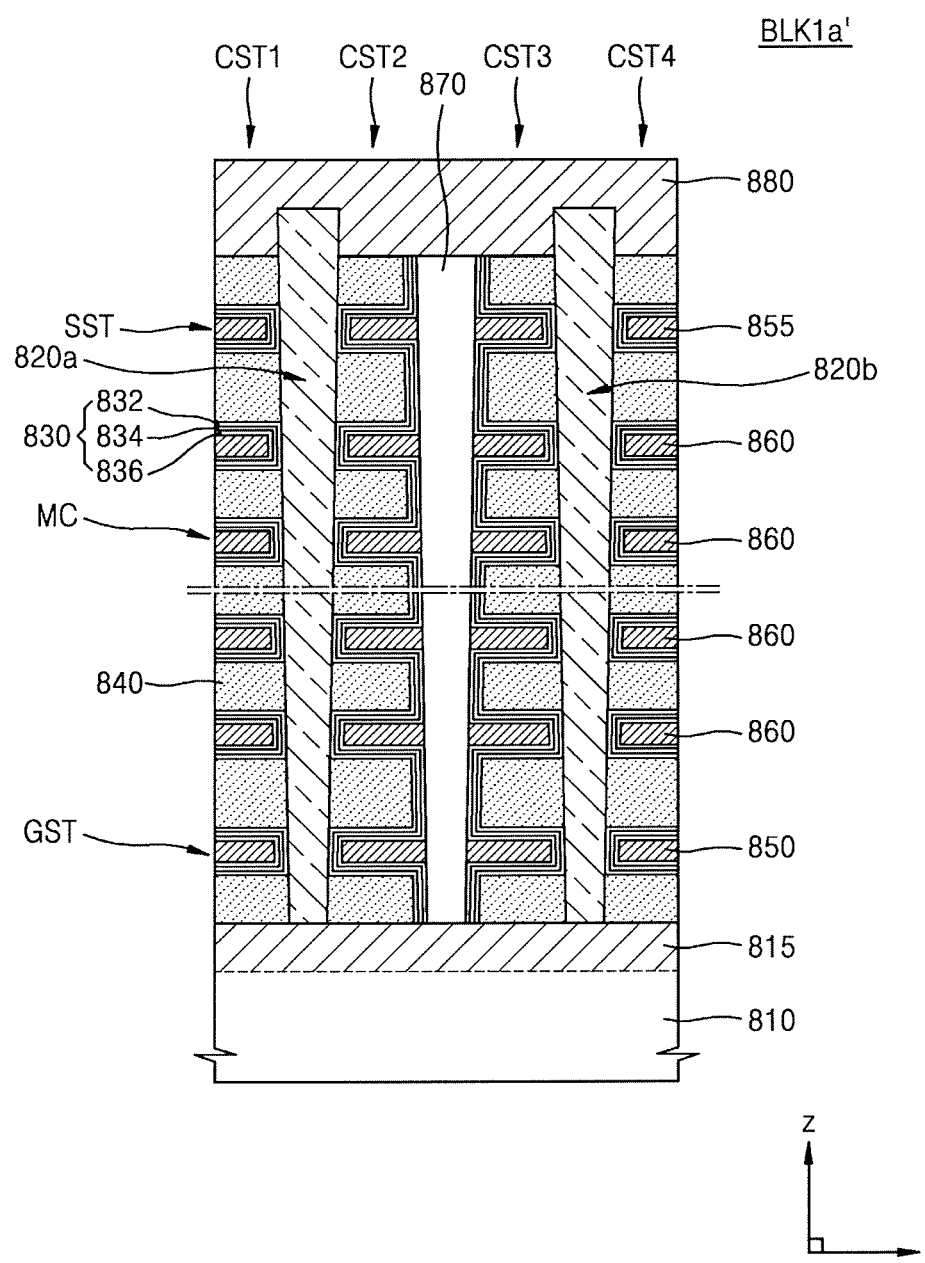
FIG. 16 is a cross-sectional view of a first memory block, which is an example of the first memory block of FIG. 15, taken along a bit line.
Figure 17:
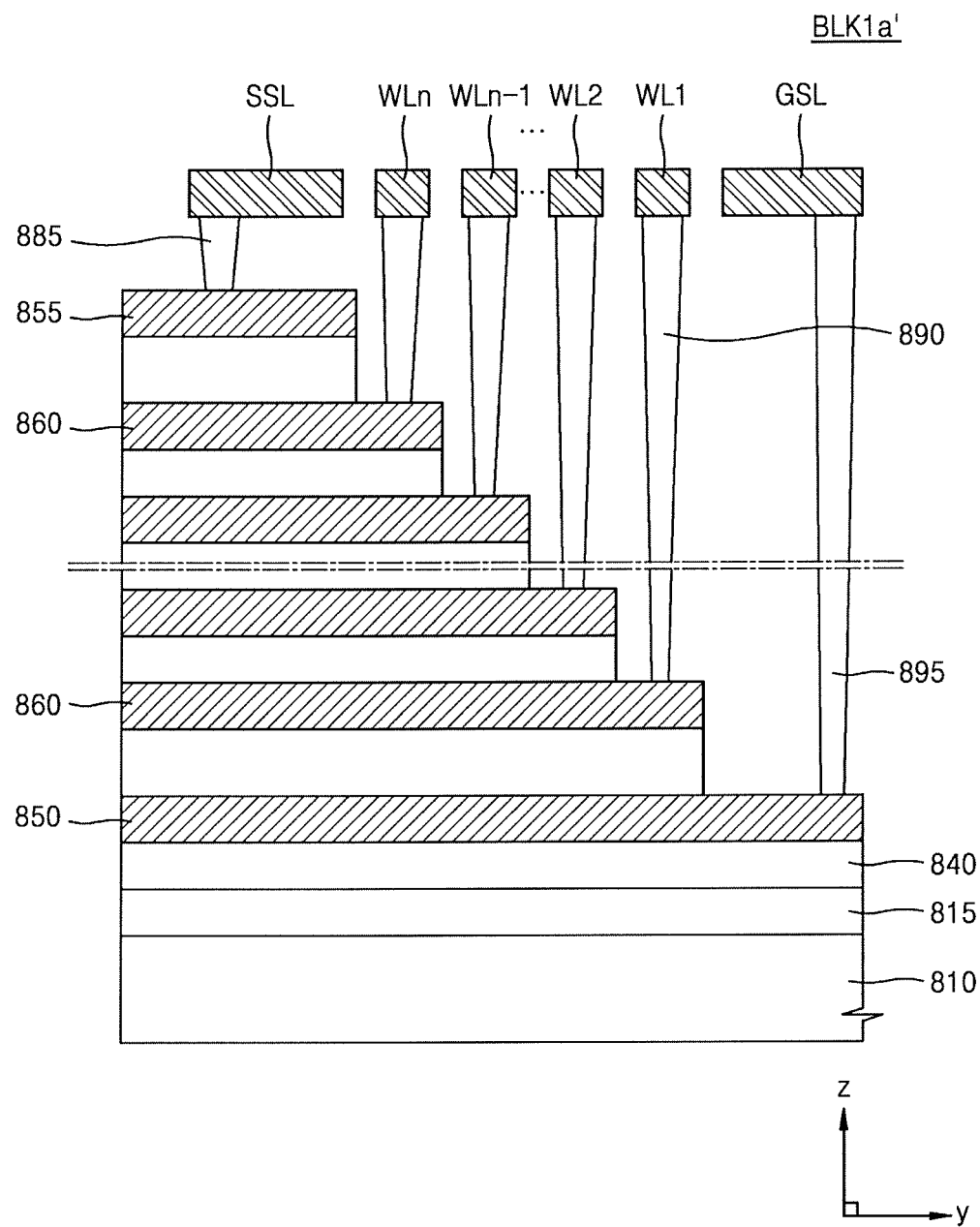
FIG. 17 is a cross-sectional view of the first memory block of FIG. 16, taken along a word line.

FIG. 16 is a cross-sectional view of a first memory block BLK1a', which is an example of the first memory block BLK1a of FIG. 15, taken along a bit line. FIG. 17 is a cross-sectional view of the first memory block BLK1a', which is an example of the first memory block BLK1a of FIG. 15, taken along a word line.

Referring to FIGS. 16 and 17, the first memory block BLK1a' may have a substrate 810 having a main surface extending in the first direction x. The substrate 810 may include a semiconductor material, for example, a Group IV semiconductor, a Group III-V compound semiconductor, or a Group II-VI oxide semiconductor. For example, the Group IV semiconductor may include silicon, germanium, or silicon-germanium. The substrate 810 may be a bulky wafer or an epitaxial layer.

Semiconductor pillars 820a and 820b may each vertically extend on the substrate 810. The semiconductor pillars 820a and 820b may include a semiconductor material such as polysilicon or single crystal silicon, and the semiconductor material may not be doped or may include p-type or n-type impurities.

The substrate 810 may include an impurity region 815 formed below the semiconductor pillars 820a and 820b. The impurity region 815 may be a source region, and may form a PN junction together with other regions of the substrate 810. The common source line CSL of FIG. 15 may be connected to the impurity region 815. According to another embodiment, the impurity region 815 may be defined by lower ends of the semiconductor pillars 820a and 820b.

Each of the memory cells MC may include a storage medium 830 formed on a sidewall of the semiconductor pillar 820a or 820b, and a control gate electrode 860 formed on the storage medium 830. Each storage medium 830 may include a tunneling isolation layer 832 on a sidewall of the semiconductor pillar 820a or 820b, a charge storing layer 834 on the tunneling isolation layer 832, and a blocking insulation layer 836 on the charge storing layer 834.

The charge storage layer 832 may have a charge storing capability. For example, the charge storage layer 832 may be of a track type, for example, may include a silicon nitride layer, quantum dots, or nanocrystals. Quantum dots or nanocrystals may include fine particles of a conductive substance, for example, a metal or a semiconductor. The tunneling insulation layer 832 and the blocking insulation layer 836 may include an oxide layer, a nitride layer, or a high dielectric layer. A high dielectric layer may be referred to as a dielectric layer having a higher dielectric constant than an oxide layer and a nitride layer.

Each string selection transistor SST may include a string selection gate electrode 855 formed on a sidewall of the semiconductor pillar 820a or 820b. The string selection transistors SST may be connected to a bit line 880. The bit line 880 may be a linear pattern extending in the first direction x. Each ground selection transistor GST may include a ground selection gate electrode 850 formed on a sidewall of the semiconductor pillar 820a or 820b.

The storage medium 830 between the string selection transistors SST and the semiconductor pillar 820a or 820b and between the ground selection transistors GST and the semiconductor pillar 820a or 820b may function as a gate insulation layer and thus may be replaced by a single insulation layer. Interlayer insulation layers 840 may be interposed between the ground selection gate electrodes 850, the control gate electrodes 860, and the string selection gate electrodes 855. The storage medium 830 may extend along respective surfaces of the interlayer insulation layers 840.

First and second cell strings CST1 and CST2 may be arranged adjacent to each other with the semiconductor pillar 820a interposed therebetween, and third and fourth cell strings CST3 and CST4 may be arranged adjacent to each other with the semiconductor pillar 820b interposed therebetween. An insulation layer 870 may be interposed between the second and third cell strings CST2 and CST3.

The string selection gate electrodes 855 may be connected to string selection lines SSL via contact plugs 885. The control gate electrodes 860 may be connected to the word lines WL1 through WLn via contact plugs 890. The ground selection gate electrodes 850 may be connected to ground selection lines GSL via contact plugs 895.

Figure 18:
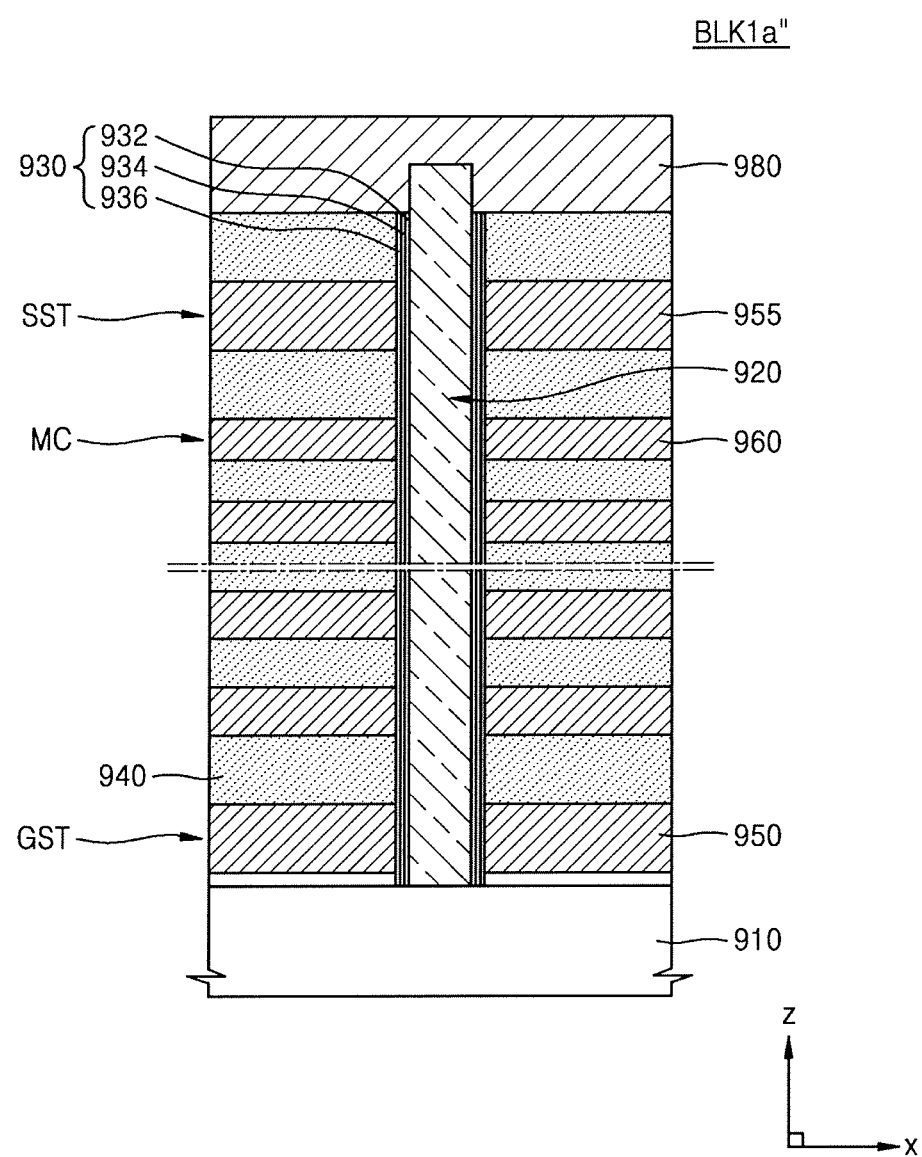
FIG. 18 is a cross-sectional view of a first memory block, which is another example of the first memory block of FIG. 15, taken along a bit line.

FIG. 18 is a cross-sectional view of a first memory block BLK1a", which is another example of the first memory block BLK1 of FIG. 15, taken along a bit line.

Referring to FIG. 18, the first memory block BLK1a" may have a substrate 910 having a main surface extending in the first direction x. The substrate 910 may include a semiconductor material, for example, a Group IV semiconductor, a Group III-V compound semiconductor, or a Group II-VI oxide semiconductor. For example, the Group IV semiconductor may include silicon, germanium, or silicon-germanium. The substrate 910 may be a bulky wafer or an epitaxial layer.

A semiconductor pillar 920 may vertically extend on the substrate 910. The semiconductor pillar 920 may include a semiconductor material such as polysilicon or single crystal silicon, and the semiconductor material may not be doped or may include p-type or n-type impurities.

A storage medium 930 may extend in the lengthwise direction of the semiconductor pillar 920. The storage medium 930 may include a tunneling isolation layer 932 on a sidewall of the semiconductor pillar 920, a charge storing layer 934 on the tunneling isolation layer 932, and a blocking insulation layer 936 on the charge storing layer 934.

A string selection transistor SST may include a string selection gate electrode 955 formed on a sidewall of the semiconductor pillar 920. The string selection transistor SST may be connected to a bit line 980. The bit line 980 may be a linear pattern extending in the first direction x. A ground selection transistor GST may include a ground selection gate electrode 950 formed on a sidewall of the semiconductor pillar 920.

The storage medium 930 between the string selection transistor SST and the semiconductor pillar 920 and between the ground selection transistor GST and the semiconductor pillar 920 may function as a gate insulation layer and thus may be replaced by a single insulation layer. Interlayer insulation layers 940 may be interposed between the ground selection gate electrodes 950, the control gate electrodes 960, and the string selection gate electrodes 955.

Figure 19:
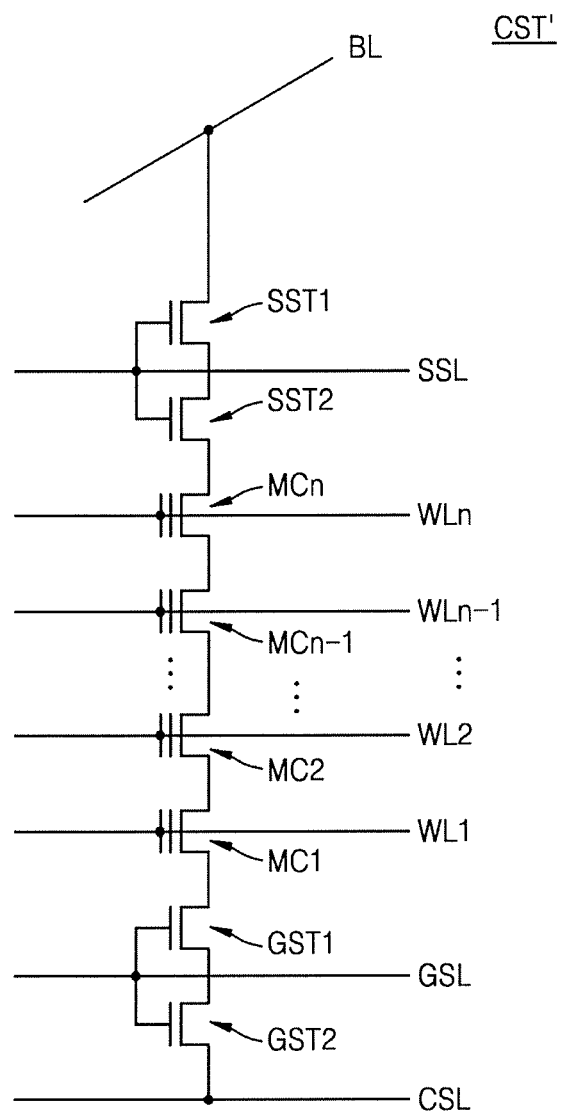
FIG. 19 is a circuit diagram of a cell string, which is an exemplary embodiment of a cell string included in the first memory block of FIG. 15.

FIG. 19 is a circuit diagram of a cell string CST', which is an embodiment of the cell string CST of FIG. 15.

Referring to FIG. 19, the cell string CST' may include at least a pair of string selection transistors SST1 and SST2, a plurality of memory cells MC, and at least a pair of ground selection transistors GST1 and GST2. A bit line BL may be connected to one end of the cell string CST', and the common source line CSL may be connected to the other end of the cell string CST'.

Some of the components included in the cell string CST' according to an exemplary embodiment are substantially the same as the counterparts included in the cell string CST of FIG. 15. Like components are indicated by like reference characters, and the components of the cell string CST' which are the same as those of the cell string CST of FIG. 15 will not be repeatedly described herein. Differences between the cell string CST of FIG. 15 and the cell string CST' according to the present embodiment will now be focused on and described.

The plurality of memory cells MC may be vertically arranged in series. The plurality of memory cells MC may store data. The plurality of word lines WL may be connected to the memory cells MC to control the memory cells MC. The number of memory cells MC may be appropriately selected according to the capacity of a non-volatile memory device.

The at least two string selection transistors SS1 and SST2 may be arranged adjacent to each other on one side of the memory cells MC. For example, the string selection transistors SST1 and SST2 may be interposed between the bit line BL and an n-th memory cell MCn and may be serially connected to the n-th memory cell MCn. The string selection transistors SST1 and SST2 may control signal exchange between the bit line BL and the memory cells MC. A string selection line SSL may be combined with both the string selection transistors SST1 and SST2. Accordingly, the string selection transistors SST1 and SST2 may interoperate with each other, like a single transistor.

The at least two ground selection transistors GST1 and GST2 may be arranged adjacent to each other on the other side of the memory cells MC, which is opposite to the side where the string selection transistors SST1 and SST2 are arranged. For example, the ground selection transistors GST1 and GST2 may be interposed between the bit line BL and a first memory cell MC1 and may be serially connected to the first memory cell MC1. The ground selection transistors GST1 and GST2 may control signal exchange between the common source line CSL and the memory cells MC. A ground selection line GSL may be combined with both the ground selection transistors GST1 and GST2. Accordingly, the ground selection transistors GST1 and GST2 may interoperate with each other, like a single transistor.

According to an exemplary embodiment, due to the inclusion of the at least two string selection transistors SST1 and SST2, the length of each of the string selection gate electrodes 855 of FIG. 16 may be greatly reduced compared to when one string selection transistor is included. Thus, each of the string selection gate electrodes 855 may fill the gaps between the interlayer insulation layers 840 of FIG. 16 without void. Moreover, due to the inclusion of the at least two ground selection transistors GST1 and GST2, the length of each of the ground selection gate electrodes 850 of FIG. 16 may be greatly reduced compared to when one ground selection transistor is included. Thus, each of the ground selection gate electrodes 850 may fill the gaps between the interlayer insulation layers 840 of FIG. 16 without void.

Figure 20:
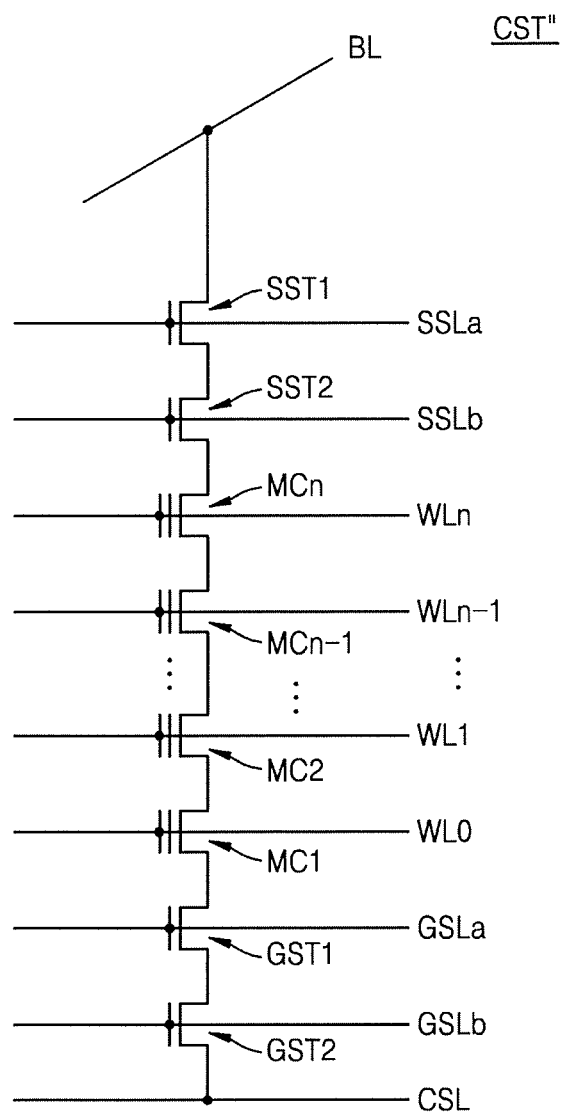
FIG. 20 is a circuit diagram of a cell string, which is an exemplary embodiment of the cell string included in the first memory block of FIG. 15.

FIG. 20 is a circuit diagram of a cell string CST", which is another embodiment of the cell string CST of FIG. 15.

Referring to FIG. 20, the cell string CST" may include at least a pair of string selection transistors SST1 and SST2, a plurality of memory cells MC, and at least a pair of ground selection transistors GST1 and GST2. A bit line BL may be connected to one end of the cell string CST", and the common source line CSL may be connected to the other end of the cell string CST".

Some of the components included in the cell string CST" according to an exemplary embodiment are substantially the same as the counterparts included in the cell string CST' of FIG. 19. Like components are indicated by like reference characters, and the components of the cell string CST" which are the same as those of the cell string CST' of FIG. 19 will not be repeatedly described herein. Differences between the cell string CST' of FIG. 19 and the cell string CST" according to an exemplary embodiment will now be focused on and described.

The at least two string selection transistors SS1 and SST2 may be arranged adjacent to each other on one side of the memory cells MC. For example, the string selection transistors SST1 and SST2 may be interposed between the bit line BL and an n-th memory cell MCn and may be serially connected to the n-th memory cell MCn. The string selection transistors SST1 and SST2 may control signal exchange between the bit line BL and the memory cells MC. A first string selection line SSLa may be connected to the first string selection transistor SST1, and a second string selection line SSLb may be connected to the second string selection transistor SST2.

The at least two ground selection transistors GST1 and GST2 may be arranged adjacent to each other on the other side of the memory cells MC, which is opposite to the side where the string selection transistors SST1 and SST2 are arranged. For example, the ground selection transistors GST1 and GST2 may be interposed between the bit line BL and a first memory cell MC1 and may be serially connected to the first memory cell MC1. The ground selection transistors GST1 and GST2 may control signal exchange between the common source line CSL and the memory cells MC. A first ground selection line GSLa may be connected to the first ground selection transistor GST1, and a second ground selection line GSLb may be connected to the second ground selection transistor GST2.

Figure 21:
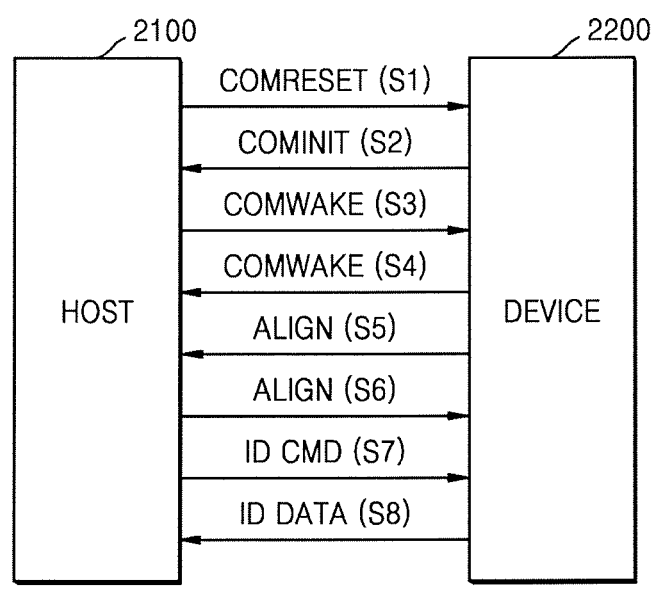
FIG. 21 is a block diagram schematically illustrating an Out of Band (OOB) sequence between a host and a device and a device recognizing process in a server virtualization system, according to an exemplary embodiment of the inventive concept.

FIG. 21 is a block diagram schematically illustrating an Out of Band (OOB) sequence between a host 2100 and a device 2200 and a device recognizing process in a server virtualization system, according to an exemplary embodiment of the inventive concept.

For example, the host 2100 may be the host 100A or 100B of FIG. 1 or 2, and the device 2200 may be the first through n-th SDs 105-1 through 105-n of FIG. 1 or the first through n-th SDs 200-1 through 200-n of FIG. 2.

First, an initialization process based on an OOB sequence according to the SATA standard will now be described.

In operation S1, the host 2100 transmits a COMRESET signal, which is an analog signal, to the device 2200. In operation S2, after confirming reception of the COMRESET signal, the device 2200 transmits a COMINIT signal, which is an analog signal, to the host 2100. In operation S3, after confirming reception of the COMINIT signal, the host 2100 transmits a COMWAKE signal, which is an analog signal, to the device 2200. In operation S4, after confirming reception of the COMWAKE signal, the device 2200 transmits a COMWAKE signal, which is an analog signal, to the host 2100. Then, in operations S5 and S6, the host 2100 and the device 2200 adjust a communication speed while exchanging an align primity signal ALIGN. In this way, the initialization process is completed.

Next, the device recognizing process which is performed after the initialization process is completed will now be described.

In operation S7, the host 2100 transmits an identify device command ID CMD to the device 2200.

In operation S8, in response to the identify device command ID CMD, the device 2200 transmits identify device data ID_DATA set by the device 2200 to the host 2100. When the device 2200 has been virtualized, the device 2200 transmits a plurality of pieces of identify device data to the host 2100. For example, when the device 2200 is set to be four virtual devices via device virtualization, the device 2200 transmits four pieces of identify device data ID_DATA (1), ID_DATA(2), ID_DATA(3), and ID_DATA(4) to the host 2100. For example, each of the four pieces of identify device data ID_DATA(1), ID_DATA(2), ID_DATA(3), and ID_DATA(4) may include information about a model name, a firmware revision, a serial number, a WWN, a physical logical sector size, a feature, and the like. Pieces of information about the serial numbers respectively included in the four pieces of identify device data ID_DATA(1), ID_DATA (2), ID_DATA(3), and ID_DATA(4) are set differently, and pieces of information about the WWNs respectively included in the four pieces of identify device data ID_DATA (1), ID_DATA(2), ID_DATA(3), and ID_DATA(4) may also be set differently.

An SD recognizing method performed in a server virtualization system and a device virtualizing method according to an exemplary embodiment of the inventive concept will now be described.

Figure 22:
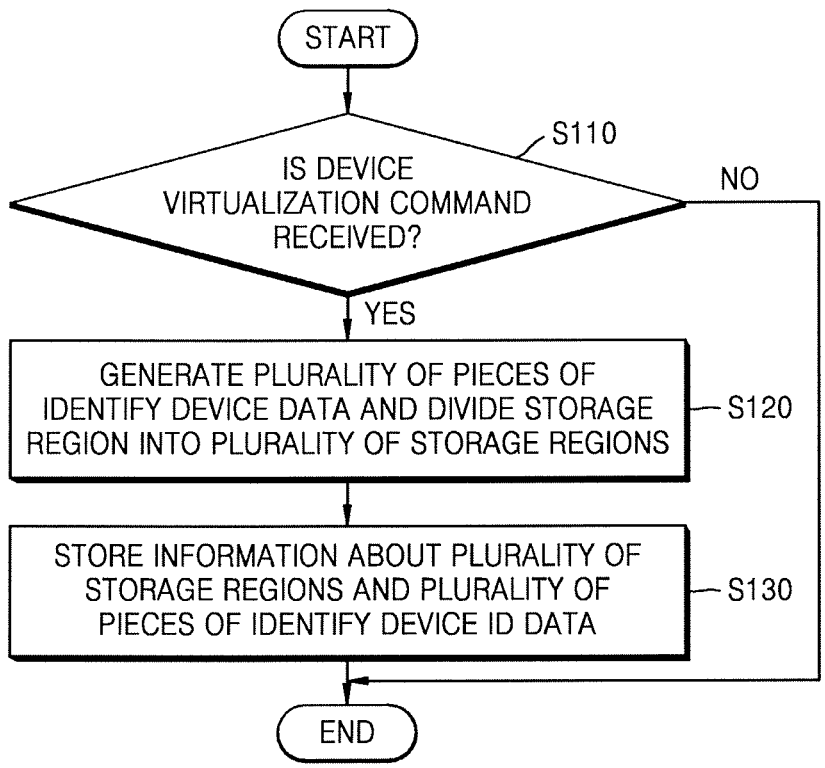
FIG. 22 is a flowchart of a device virtualization method in an SD, according to an exemplary embodiment of the inventive concept.
Figure 23:
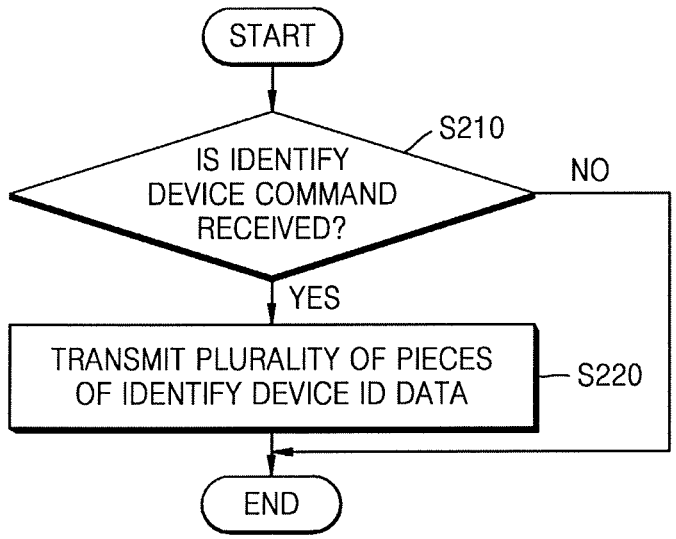
FIG. 23 is a flowchart of a method of processing a device recognition command in an SD, according to an exemplary embodiment of the inventive concept.

Methods illustrated in FIGS. 22 and 23 may be performed by the memory controller 710 of the SD 700. In detail, the methods of FIGS. 22 and 23 may be performed under the control of the processor 711 of the memory controller 710 of FIG. 12.

FIG. 22 is a flowchart of a device virtualization method in the SD 700, according to an exemplary embodiment of the inventive concept.

In operation S110, the memory controller 710 of the SD 700 determines whether a device virtualization command is received. For example, the device virtualization command may be received from the host 100A of FIG. 1 or the host 100B of FIG. 2. In another example, the device virtualization command may be received via a manufacturer management tool during an SD manufacturing process.

In operation S120, in response to the device virtualization command, the memory controller 710 of the SD 700 generates a plurality of pieces of identify device data so that one physical SD is recognized as a plurality of SDs. In detail, the memory controller 710 divides a storage region of the SD 700 into a plurality of storage regions and generates different pieces of identify device data for the plurality of storage regions.

For example, the memory controller 710 may divide the storage region into storage regions the number of which is indicated by the device virtualization command, and may generate different pieces of identify device data for the storage regions. In another example, the memory controller 710 may divide the storage region into storage regions the number of which is set by default, and may generate different pieces of identify device data for the storage regions.

For example, the pieces of identify device data generated by the memory controller 710 may include information about a model name, a firmware revision, a serial number, a WWN, a physical logical sector size, a feature, and the like. The memory controller 710 differently sets at least serial number information and WWN information for a plurality of pieces of identify device data derived from one physical SD.

Next, in operation S130, the memory controller 710 stores information about the storage regions and the plurality of pieces of identify device data in the memory device 720. In detail, the memory controller 710 transmits to the memory device 720 a command signal, an address signal, data, and a control signal that are necessary for writing the information about the storage regions and the plurality of pieces of identify device data to the memory device 720. Accordingly, the information about the storage regions and the plurality of pieces of identify device data are written to the memory device 720.

FIG. 23 is a flowchart of a method of processing a device recognition command in the SD 700, according to an exemplary embodiment of the inventive concept.

In operation S210, the memory controller 710 of the SD 700 determines whether the identify device command ID CMD is received. For example, the identify device command ID CMD may be received from the host 100A of FIG. 1 or the host 100B of FIG. 2.

In operation S220, when the identify device command ID CMD is received, the memory controller 710 of the SD 700 transmits to the host a plurality of pieces of identify device data read from the memory device 720. The plurality of pieces of identify device data are the pieces of identify device data for the virtual SDs that are derived from one physical SD via the device virtualization of FIG. 22.

An initialization and device-recognition method in a server virtualization system according to an exemplary embodiment of the inventive concept will now be described.

Figure 24:
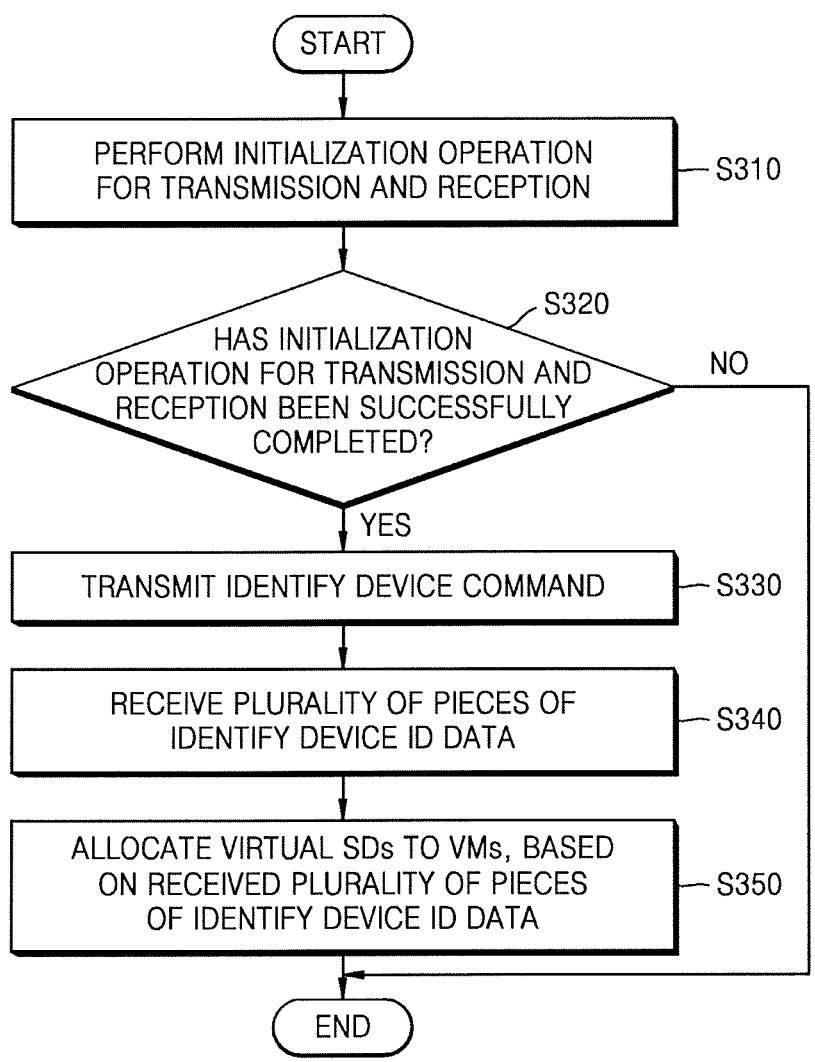
FIG. 24 is a flowchart of an initialization and device-recognition method in a server virtualization system, according to an exemplary embodiment of the inventive concept.

FIG. 24 is a flowchart of an initialization and device-recognition method in a server virtualization system, according to an exemplary embodiment of the inventive concept.

For example, the initialization and device-recognition method of FIG. 24 may be performed in the host 100A or 100B of the computing system 1000A or 1000B of FIG. 1 or 2.

First, in operation 5310, the host 100A or 100B performs an initialization operation for transmission and reception with an SD connected to the host 100A or 100B. For example, when the SD is connected to the host 100A or 100B, the host 100A or 100B may perform the initialization operation for transmission and reception by using an OOB sequence based on the SATA standard. In detail, the initialization operation for transmission and reception may be performed based on operations S1 through S6 of FIG. 21.

In operation 5320, the host 100A or 100B determines whether the initialization operation for transmission and reception has been successfully completed. For example, the host 100A or 100B determines whether operations S1 through S6 of FIG. 21 have been successfully completed.

When it is determined that the initialization operation for transmission and reception has been successfully completed, the host 100A or 100B transmits the identify device command ID CMD to the SD, in operation 5330.

In operation S340, the host 100A or 100B receives a plurality of pieces of identify device data, from SDs for which the plurality of pieces of identify device data are set via device virtualization, based on the identify device command ID CMD.

In operation S350, the host 100A or 100B allocates virtual SDs to VMs, based on the received plurality of pieces of identify device data. Accordingly, as illustrated in FIG. 9 or 10, one physical SD (for example, the first SD 105-1 or 200-1) may be allocated to a plurality of VMs of the host 100A or 100B. For example, a plurality of virtual SDs sda, sdb, sdc, and sdd that constitute one physical SD (for example, the first SD 105-1 or 200-1) may be respectively allocated to different VMs.

Figure 26:
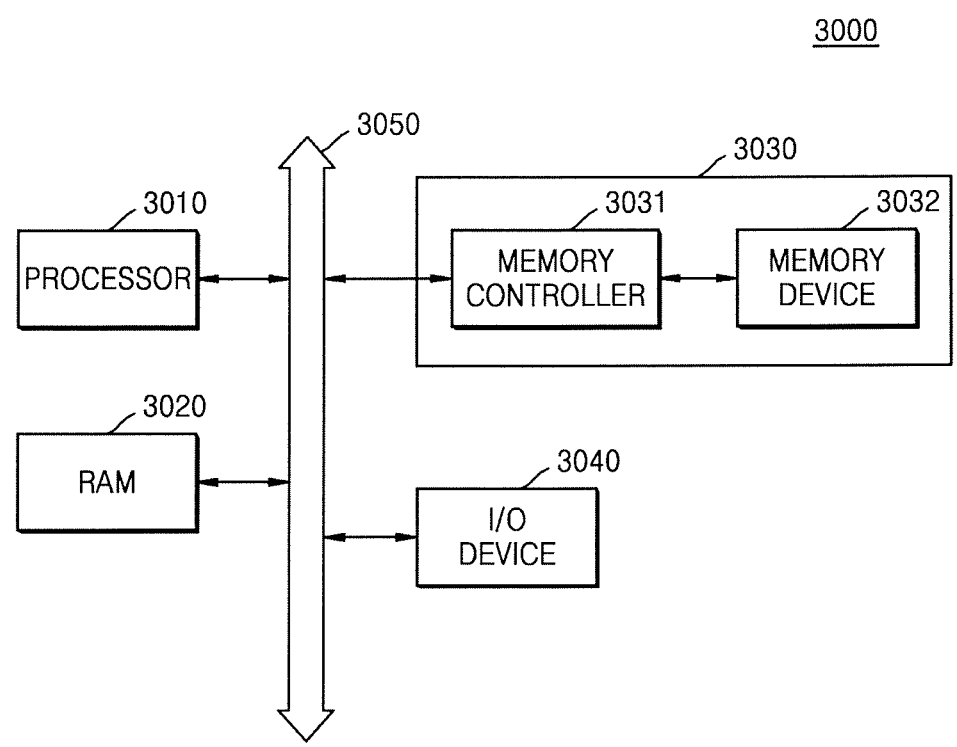
FIG. 26 is a block diagram of an electronic device to which an SD according to an exemplary embodiment of the inventive concept is applied.

FIG. 26 is a block diagram of an electronic device 3000 to which an SD 3030 according to an exemplary embodiment of the inventive concept is applied.

Referring to FIG. 26, the electronic device 3000 includes a processor 3010, a random access memory (RAM) 3020, the SD 3030, an input/output (I/O) device 3040, and a bus 3050.

Although not shown in FIG. 26, the electronic device 3000 may further include ports which are capable of communicating with a video card, a sound card, a memory card, a USB device or other electronic apparatuses. The electronic device 3000 may be implemented by using a personal computer, a notebook computer, a mobile apparatus, a personal digital assistant (PDA), a digital camera, or the like.

The bus 3050 refers to a transmission channel via which data, a command signal, an address signal, and control signals are transmitted between the other components of the electronic device 3000.

The processor 3010 may execute specific calculations or specific tasks. For example, the processor 3010 may be a micro-processor or a central processing unit (CPU). The processor 3010 may communicate with the RAM 3020, the SD 3030, and the I/O device 3040 through the bus 3050, such as an address bus, a control bus, or a data bus. In some embodiments, the processor 3010 may be connected to an expansion bus such as a peripheral component interconnect (PCI) bus.

Pieces of data that are necessary for performing a process and generated by the processor 3010 are loaded into the RAM 3020. The RAM 3020 may operate as a main memory, and may be implemented by using a Dynamic Random Access Memory (DRAM) or Static Random Access Memory (SRAM).

The SD 3030 includes a memory controller 3031 and a memory device 3032. The SD 3030 may be the SD 700 of FIG. 11. In other words, the memory controller 3031 and the memory device 3032 may be the memory controller 710 and the memory device 720 of FIG. 11, respectively.

The I/O device 3040 may include an input device, such as a keyboard, a keypad or a mouse, and an output device, such as a printer or a display.

The processor 3010 may perform a calculation or data processing, which correspond to a user command input via the I/O device 3040. To perform a calculation or data processing corresponding to the user command, the processor 3010 may transmit to the SD 3030 a request to read data from the SD 3030 or write data to the SD 3030.

The SD 3030 may perform a read operation or a write operation according to the request received from the processor 3010.

Meanwhile, a storage device according to the inventive concept may be mounted by using various types of packages, e.g., a package on package (POP), a ball grid array (BGA), a chip scale package (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small-outline integrated circuit (SOIC), a shrink small outline package (SSOP), a thin small outline package (TSOP), a system in package (SIP), a multi chip package (MCP), a wafer-level fabricated package (WFP), and a wafer-level processed stack package (WSP).

While the inventive concept has been particularly shown and described with reference to exemplary embodiments thereof, it will be understood that various changes in form and details may be made therein without departing from the spirit and scope of the inventive concept.

What is claimed is:

1. A memory controller comprising:
a processor configured to receive an identity device command from a host, determine N virtual storage devices (SDs) supported by a single physical storage device (SD), and generate a unique identifier for each of the determined N virtual SDs; and
a host interface which transmits the generated identifiers to the host,
wherein each identifier identifies a different physical SD for enabling the host to recognize the single physical SD as N distinct physical SDs, and
wherein N is a natural number equal to or greater than two.

2. The memory controller of claim 1, wherein each identifier comprises information that defines a corresponding one of the virtual SDs.

3. The memory controller of claim 2, wherein the information that defines the corresponding virtual SD is determined to have a unique device port address when the memory controller communicates with the host.

4. The memory controller of claim 2, wherein the information that defines the corresponding virtual SD comprises at least one selected from information about a serial number and information about a world wide name (WWN).

5. The memory controller of claim 1, wherein each identifier comprises serial number information and WWN information.

6. The memory controller of claim 1, wherein the processor divides a storage region of the single physical SD into a plurality of storage regions, based on an initially set command, and assigns each of the plurality of storage regions a corresponding one of the identifiers.

7. The memory controller of claim 6, wherein the processor divides the storage region into the plurality of storage regions by dividing a maximum logical block address of the single physical SD by the N.

8. The memory controller of claim 1, further comprising a memory that stores the identifiers.

9. A storage device (SD) comprising:
a memory controller which generates a control signal based on a command received from a host; and
a memory device which writes or reads data, based on the control signal,
wherein the memory controller determines N virtual storage devices (SDs) supported by the memory device, generates a unique identifier for each of the determined N virtual SDs, and transmits the generated identifiers to the host in response to an identify device command received from the host,
wherein each identifier identifies a different physical storage device (SD) for enabling the host to recognize the storage device (SD) as a plurality of distinct physical storage devices (SDs) and
wherein N is a natural number equal to or greater than two.

10. The SD of claim 9, wherein each identifier corresponds to one of a plurality of storage regions into which a storage region of the single memory device is divided, in response to the received identify device command.

11. The SD of claim 9, wherein each . . . identifier comprises at least one selected from information about a serial number and information about a world wide name (WWN), and different serial numbers and different WWNs are allocated for the plurality of physical SDs.

12. The SD of claim 9, wherein the single memory device is includes at least one non-volatile memory device.

13. The SD of claim 12, wherein the non-volatile memory device is a flash memory device.

14. The SD of claim 9, wherein the memory controller reads the identifiers from the memory device according to the identify device command and transmits the read identifiers to the host.

15. The SD of claim 9, wherein the memory controller calculates a physical address of the memory device, based on device port address information and logical block address information that are received from the host.

16. A server virtualization system comprising:
a server which communicates with devices that are connected to a host bus adaptor (HBA) and processes data in a virtualization environment; and
at least one storage device (SD) that is connected to the HBA,
wherein a single physical SD of the at least one SD determines N virtual storage devices (SDs) supported by the single physical SD, generates a unique identifier for each of the determined N virtual SDs, and transmits the generated identifiers to the server in response to an identify device command received from the server,
wherein each identifier identifies a different physical (SD) for enabling the server to recognize the single physical SD as a plurality of distinct physical storage devices (SDs) and
wherein N is a natural number equal to or greater than two.

17. The server virtualization system of claim 16, wherein each identifier corresponds to one of a plurality of storage regions into which an overall storage capacity of the single physical SD is divided, in response to the received identify device command.

18. The server virtualization system of claim 16, wherein the server comprises:
a plurality of virtual machines (VMs) obtained by implementing a computing environment by using software;
a hypervisor which manages the plurality of VMs; and
the HBA which is connected to the at least one SD and performs interfacing for data communication.

19. The server virtualization system of claim 18, wherein the HBA supports a single root input/output virtualization (SR-IOV) function for providing I/O virtualization.

20. The server virtualization system of claim 18, wherein the HBA transmits the identify device command to a device connected to the server.

* * * * *